US012655593B2

(12) United States Patent (10) Patent No.: US 12,655,593 B2
Dingman (45) Date of Patent: Jun. 16, 2026

(54) SUCTION PILE EQUIPMENT

(71) Applicant: Delta SubSea, LLC, Montgomery, TX (US)

(72) Inventor: Scott P. Dingman, Montgomery, TX (US)

(73) Assignee: Delta SubSea, LLC, Montgomery, TX (US)

( * ) Notice: Subject to any disclaimer, the term of this patent is extended or adjusted under 35 U.S.C. 154(b) by 538 days.

(21) Appl. No.: 18/454,946

(22) Filed: Aug. 24, 2023

(65) Prior Publication Data

US 2023/0392336 A1 Dec. 7, 2023

Related U.S. Application Data

(63) Continuation of application No. 17/665,291, filed on Feb. 4, 2022, now Pat. No. 11,773,557, which is a (Continued)

(51) Int. Cl.
*E02D 5/22* (2006.01)
*E02D 13/00* (2006.01)
(Continued)

(52) U.S. Cl.
CPC ............. *E02D 5/223* (2013.01); *E02D 13/00* (2013.01); *F16L 55/11* (2013.01); (Continued)

(58) Field of Classification Search
CPC ........... E02D 5/223; E02D 13/00; E02D 7/20; E02D 5/54; F16L 55/11; F16L 55/1125; G01M 3/36; B63B 21/27
See application file for complete search history.

(56) References Cited

U.S. PATENT DOCUMENTS 4,408,405 A 10/1983 Williams
4,953,396 A * 9/1990 Langsdorf ............... G01M 3/02
73/49.3
(Continued)

FOREIGN PATENT DOCUMENTS

GB 2521882 A 7/2015
WO 2020051330 3/2020

*Primary Examiner* — David Z Huang
(74) *Attorney, Agent, or Firm* — Jason P. Mueller; FisherBroyles, LLP

(57) ABSTRACT

Disclosed embodiments include a suction pile vent plug having a cylindrically-shaped body having a sealing element, a plurality of coupling features, and a handle connected to the cylindrically-shaped body. The sealing element is configured to form a watertight seal with walls of a suction pile vent into which the vent plug is installed. The plurality of coupling features are configured to engage with corresponding coupling features of the suction pile vent. The movable handle is configured to be moved into one or more locked configurations. Disclosed embodiments further include a suction pile vent having a hollow cylindrically-shaped body having coupling features. The coupling features are configured to engage with corresponding coupling features of a suction pile vent plug to thereby mechanically couple the suction pile vent plug to the suction pile vent. Disclosed embodiments further include a fluidic port that fluidically couples a suction pile to a removable fluidic coupling.

19 Claims, 26 Drawing Sheets

Related U.S. Application Data continuation of application No. 16/560,693, filed on Sep. 4, 2019, now Pat. No. 11,242,663.

(60) Provisional application No. 62/727,310, filed on Sep. 5, 2018.

(51) Int. Cl.

| | |
|---|---|
| *F16L 55/11* | (2006.01) |
| *G01M 3/36* | (2006.01) |
| *B63B 21/27* | (2006.01) |
| *E02D 5/54* | (2006.01) |
| *E02D 7/20* | (2006.01) |

(52) U.S. Cl.
CPC .......... *F16L 55/1125* (2013.01); *G01M 3/36* (2013.01); *B63B 21/27* (2013.01); *E02D 5/54* (2013.01); *E02D 7/20* (2013.01)

(56) References Cited

U.S. PATENT DOCUMENTS

| | | | | |
|---|---|---|---|---|
| 5,382,115 | A | 1/1995 | Jones | |
| 6,318,155 | B1 * | 11/2001 | Carr | F01P 11/18 |
| | | | | 73/49.7 |
| 7,621,059 | B2 | 11/2009 | Mccoy, Jr. | |
| 9,221,522 | B2 | 12/2015 | Mohrfeld | |
| 9,446,821 | B1 | 9/2016 | Mohrfeld | |
| 9,458,595 | B2 | 10/2016 | Mohrfeld | |
| 9,868,492 | B1 * | 1/2018 | Mohrfeld | E02D 7/20 |
| 2006/0127187 | A1 | 6/2006 | Raines | |
| 2015/0096764 | A1 | 4/2015 | Magnuson | |
| 2015/0191220 | A1 | 7/2015 | Mohrfield | |
| 2015/0354742 | A1 | 12/2015 | Holtby | |
| 2016/0090709 | A1 * | 3/2016 | Mohrfeld | E02D 31/10 |
| | | | | 49/404 |
| 2017/0056707 | A1 | 3/2017 | Hockridge | |

\* cited by examiner

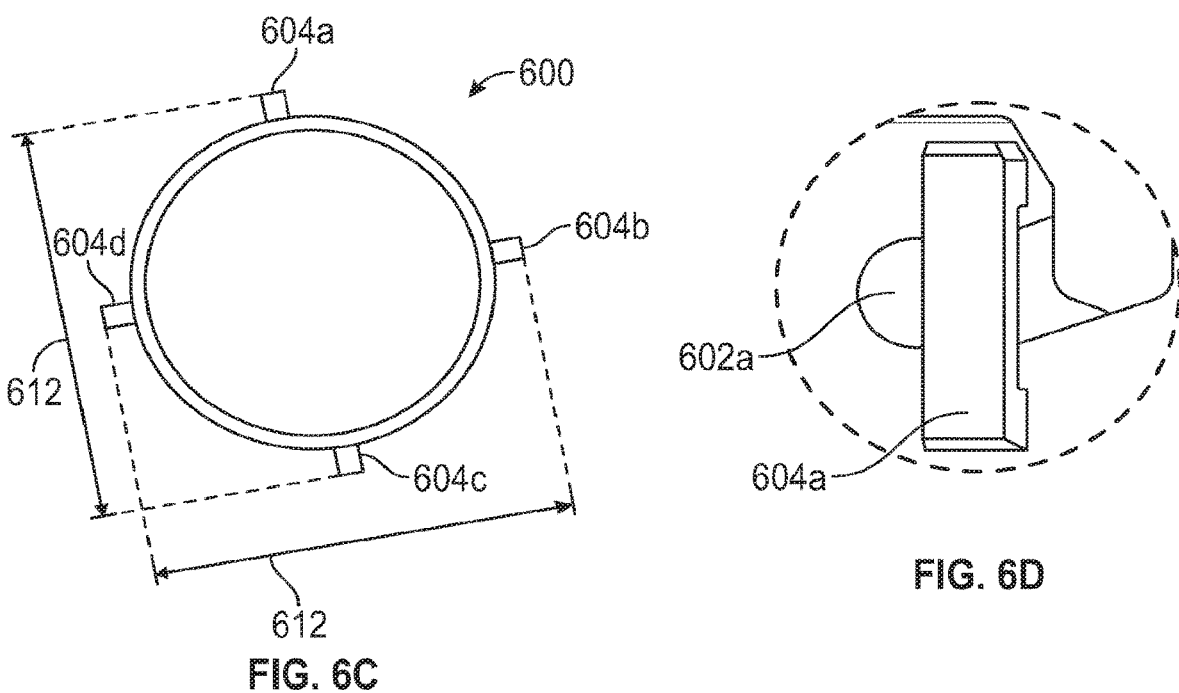
FIG. 6C
FIG. 6D
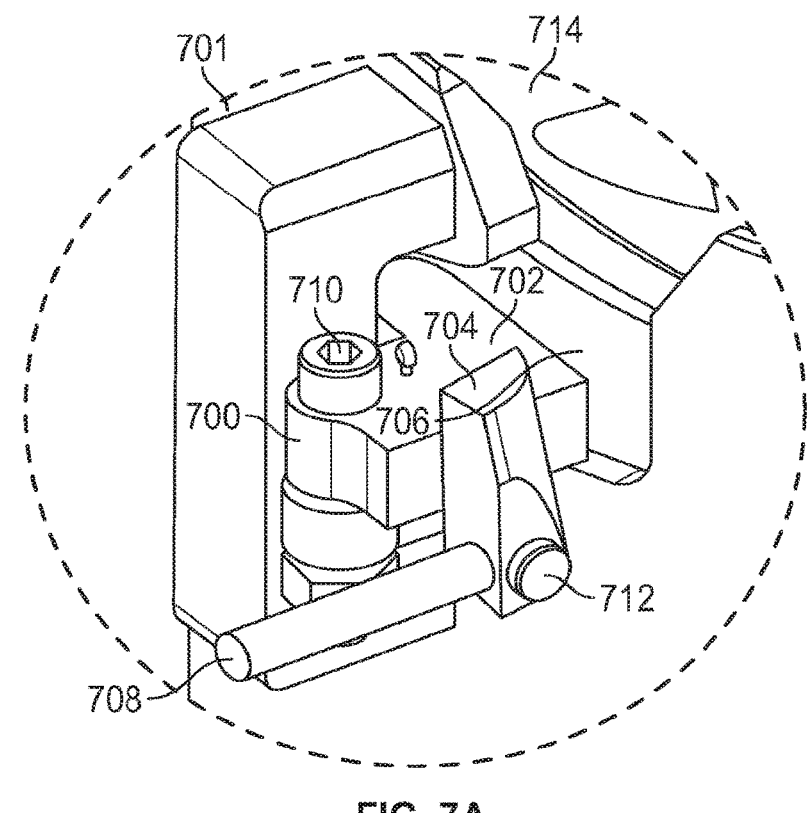
FIG. 7A

FIG. 13B          FIG. 13C

SUCTION PILE EQUIPMENT

CROSS-REFERENCE TO RELATED APPLICATIONS

This application is a continuation of U.S. patent application Ser. No. 17/665,291, filed Feb. 4, 2022, which is itself a continuation of U.S. patent application Ser. No. 16/560,693, filed Sep. 4, 2019, now U.S. Pat. No. 11,242,663, the entire contents of both of which are incorporated herein by reference. This application claims the benefit of the filing date of U.S. Provisional Patent Application No. 62/727,310, filed Sep. 5, 2018, the entire contents of which is incorporated herein by reference in its entirety.

BRIEF DESCRIPTION OF THE DRAWINGS

The accompanying drawings are part of the present disclosure and are incorporated into the specification. The drawings illustrate examples of embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

FIG. 6C is a top view of the suction pile vent shown in FIG. 6A, in accordance with one or more embodiments of the disclosure.

FIG. 6D is an enlarged view of coupling features of the suction pile vent shown in FIG. 6A, in accordance with one or more embodiments of the disclosure.

FIG. 7A is a three-dimensional view of a latching and locking mechanism of a suction pile vent in a first configuration, in accordance with one or more embodiments of the disclosure.

FIG. 13B is a side view of the fluidic coupling installed in a fluidic port shown in FIG. 13A, in accordance with one or more embodiments of the disclosure.

FIG. 13C is a side view of the fluidic coupling installed in a fluidic port shown in FIG. 13A, in accordance with one or more embodiments of the disclosure.

DETAILED DESCRIPTION

This disclosure generally relates to suction pile anchors. Suction piles (also known as suction caissons) are fixed platform anchors that are used as anchors for offshore installations, oil platforms, oil drilling platforms, etc. A suction pile is essentially a large cylinder that is closed at one end. The structure is lowered to the ocean floor, with a downwardly facing open end, where the structure partially sinks into ocean-floor sediment of its own weight. Water is then pumped out of the structure causing a negative pressure inside the structure. The negative pressure forces the suction pile into the seabed sediment whereby the suction pile becomes strongly attached to the ocean floor and serves as an anchor. Once installed, the suction pile resists axial and lateral loads and may be used to secure mooring lines that are attached to the suction pile at various load points.

Figures 1A, 1B, 1C, 1D:
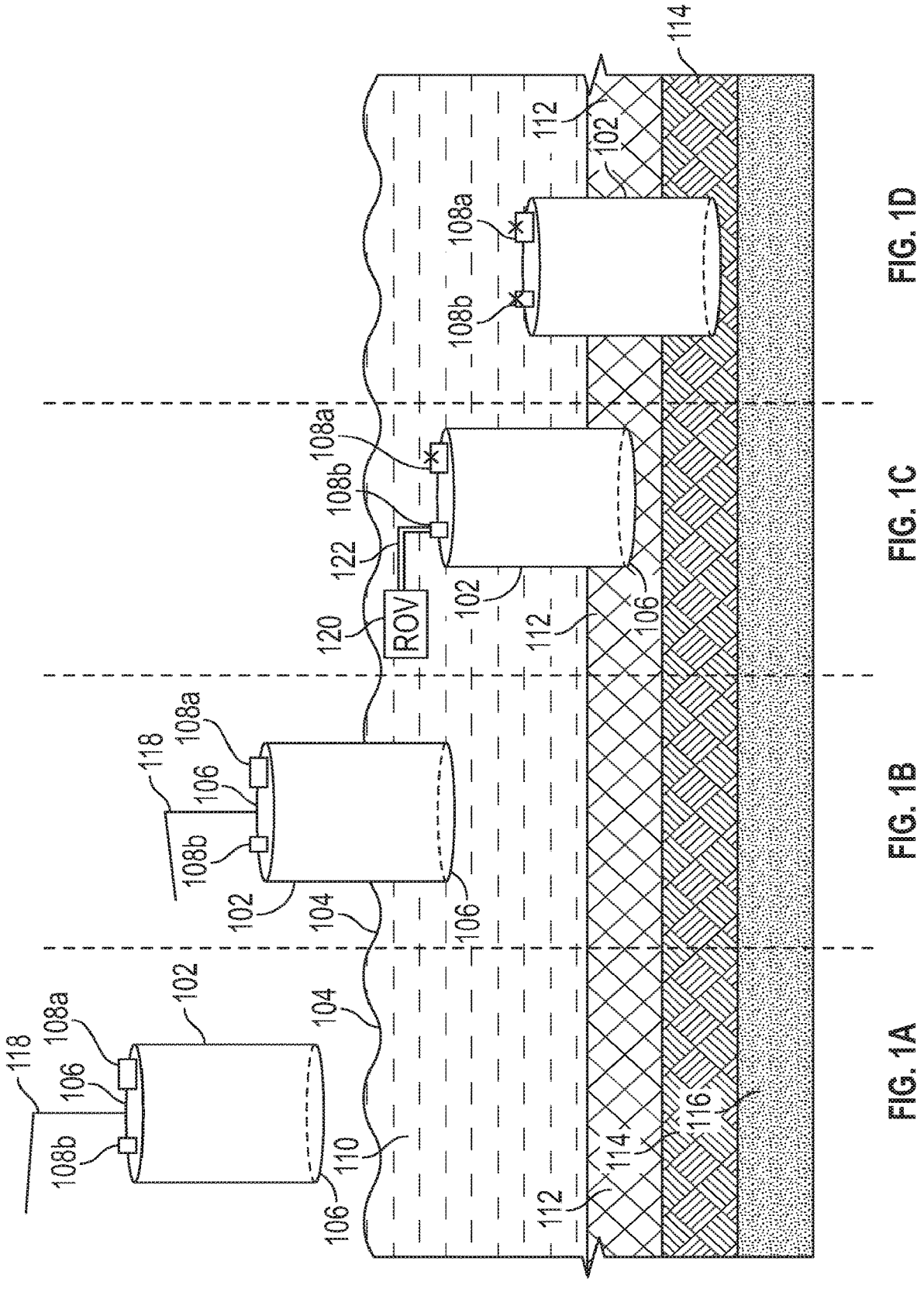
FIG. 1A illustrates a first configuration of a suction pile during installation, in accordance with one or more embodiments of the disclosure.
FIG. 1B illustrates a second configuration of a suction pile during installation, in accordance with one or more embodiments of the disclosure.
FIG. 1C illustrates a third configuration of a suction pile during installation, in accordance with one or more embodiments of the disclosure.
FIG. 1D illustrates a fourth configuration of a suction pile during installation, in accordance with one or more embodiments of the disclosure.

FIGS. 1A to 1D illustrate a process of installing a suction pile, according to one or more embodiments. FIG. 1A illustrates a suction pile 102 above an ocean surface 104. Suction pile 102 is a hollow cylinder having an open end 106 facing the ocean surface 104, and a closed end 106. The top of suction pile 102 may have various pieces of suction pile equipment 108a and 108b. As described in greater detail below, suction pile equipment may include a vent 108a that may be opened and closed. When open, vent 108a may allow air and water to flow through suction pile 102. Suction pile equipment may also include a port 108b that may be used to pump water out of suction pile 102 when suction pile 102 is submerged, during later stages of the installation process.

Below the ocean surface 104 is a region of seawater 110 that is bounded below by various layers of material of the ocean floor. For example, the ocean floor may include a layer of clay 112 and/or a layer of sand or gravel 114, which may be supported by bedrock 116. Suction pile 102 may be lowered into the ocean by a crane 118 or other suitable lifting/positioning apparatus. As shown in FIGS. 1B, 1C, and 1D, suction pile 102 may be lowered into the ocean and may be forced into the pliable layers, 112 and 114, of the ocean floor, thereby becoming anchored in such layers.

FIG. 1B illustrates a second configuration of suction pile 102 during installation, according to one or more embodiments. In this configuration, suction pile 102 is partially submerged with open end 106 below the ocean surface 104 while the closed end 106 is above the ocean surface 104. In this configuration, as suction pile 102 is being lowered into the ocean, vent 108a may be placed in an open configuration. In this regard, air and/or water is allowed to flow through opened vent 108a as suction pile 102 is lowered into the ocean. In this configuration, port 108b may be in an open or closed configuration. The configuration of vent 108a and port 108b may be maintained until suction pile 102 has been fully lowered into the ocean and has come to rest on the first pliable layer 112 of the ocean floor.

FIG. 1C illustrates a third configuration of suction pile 102 during installation, according to one or more embodiments. In this configuration, suction pile 102 has come to rest on the first pliable layer 112 of the ocean floor. As shown, open 106 of suction pile 102 may partially penetrate the surface of layer 112 due to its own weight. In the next stage of installation, vent 108a may be closed to form a watertight seal. Water may then be pumped out of suction pile 102 through port 108b. A fluidic connection may be made between port 108b and a remotely operated vehicle (ROV) 120. In this example, a hose 122 or other suitable fluidic conduit may be connected between port 108b and ROV 120. A pump on ROV 120 may be used to pump water out of suction pile 102. Removal of water from suction pile 102 creates a negative pressure within suction pile 102. The presence of negative pressure within suction pile 102 allows the greater pressure of water external to suction pile 102 to force suction pile 102 down into one or more sedimentary layers, 112 and 113, of the ocean floor, as shown in FIG. 1D.

FIG. 1D illustrates a fourth configuration of suction pile 102 during installation, according to one or more embodiments. In this configuration, suction pile 102 has been forced down into layers, 112 and 114, of the ocean floor due to negative pressure induced in suction pile 102 by removal of water from suction pile 102, as described above with reference to FIG. 1C. In this configuration, hose 122 that connected port 108b to ROV 120 (e.g. see FIG. 1C) has been removed and both vent 108a and port 108b have been closed to form a watertight seal. In this configuration, a negative pressure may be maintained within suction pile 102. As such, suction pile 102 may be firmly anchored to the ocean floor and may be used as a mooring for offshore installations, oil platforms, oil drilling platforms, etc., as described above.

Figure 2:
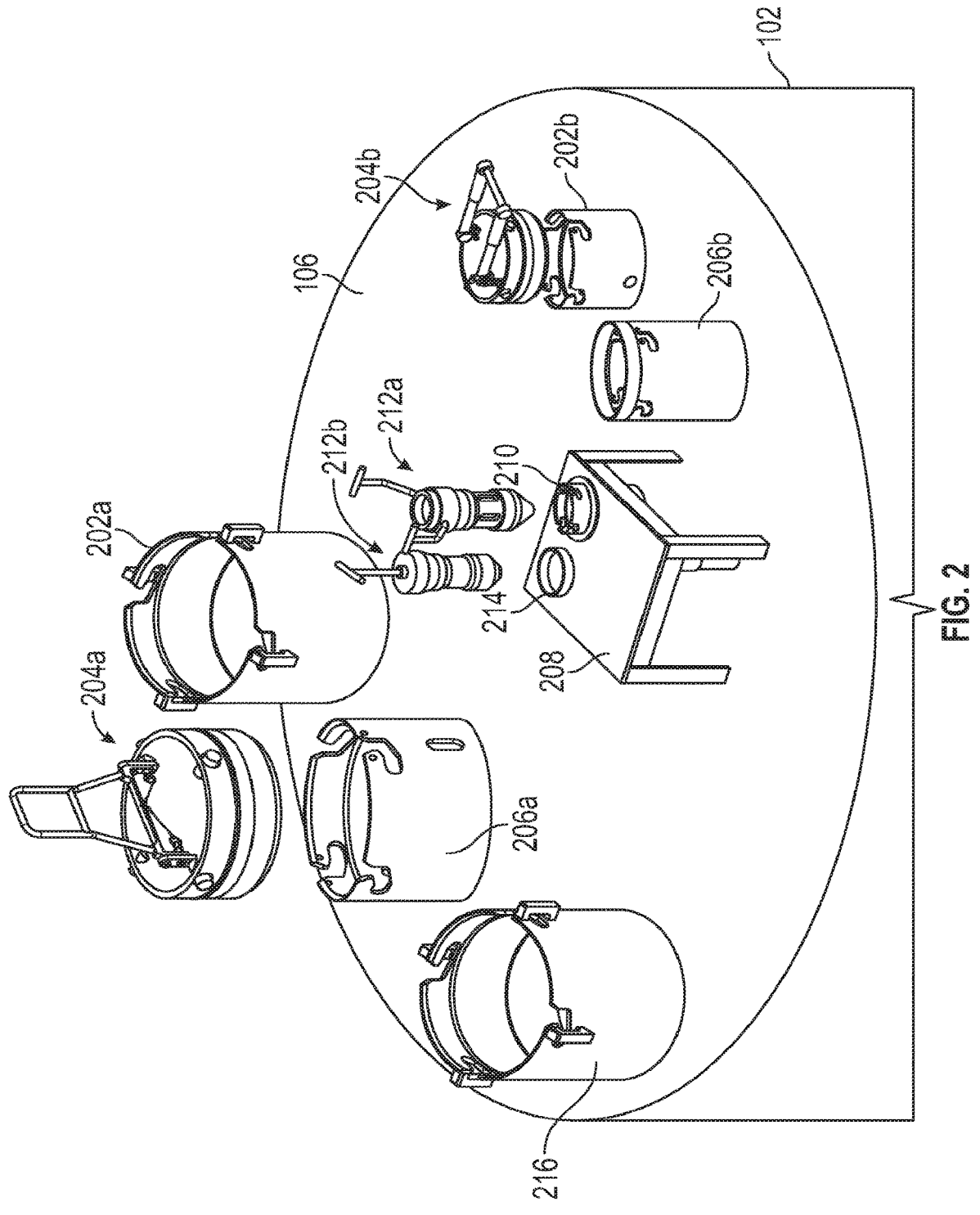
FIG. 2 illustrates suction pile equipment installed on a top surface of a suction pile, in accordance with one or more embodiments of the disclosure.

FIG. 2 illustrates various pieces of suction pile equipment installed on a top surface 106 of a suction pile 102, in accordance with one or more embodiments of the disclosure. Suction pile equipment may include one or more vents, 202a and 202b, and corresponding vent plugs, 204a and 204b. Suction pile equipment may further include one or more parking receptacles, 206a and 206b, that may be used to temporarily store respective vent plugs, 204a and 204b, when respective vents, 202a and 202b, are in respective open configurations.

Suction pile equipment may further include a support structure 208 that supports a fluidic port 210 and receptacle 214. Port 210 may be configured to receive a fluidic coupling 212a (i.e., a hot stab) to allow water to be pumped out of suction pile 102, as mentioned above and described in greater detail below. When water is not being pumped out of suction pile 102, port 210 may be closed by engaging with a corresponding plug 212b (e.g., a dummy stab). Support structure 208 may further include a parking receptacle 214 that may be configured to hold either fluidic coupling 212a or plug 212b. A further embodiment vent 216 is also shown in FIG. 2, as described in greater detail below.

In an example embodiment, vent 202a may be a cylindrical structure having a 24 inch diameter, while vent 202b may be a cylindrical structure having a 12 inch diameter. Vents 202a and 202b may be affixed to top surface 106 of suction pile 102 by welding. Vents 202a and 202b may be configured to be secured over corresponding holes (not shown) on surface 106 of suction pile 102. Vents 202a and 202b may be configured to be open or closed. In a closed configuration, vents 202a and 202b may be sealed with respective vent plugs 204a and 204b. As described in greater detail below, vents 202a and 202b, and respective vent plugs 204a and 204b, have corresponding coupling features that allow vent plugs 204a and 204b to be removably coupled to respective vents, 202a and 202b.

When in a closed configuration, vent plugs 204a and 204b may provide a watertight seal to respective vents 202a and 202b. When in an open configuration, vents 202a and 202b may allow water and air to flow through suction pile 102. When in an open configuration, vent plugs 204a and 204b may be stored in respective parking receptacles 206a and 206b. Parking receptacles 206a and 206b are configured to be holding devices having cylindrical structures that are similar to cylindrical structures of corresponding vents 204a and 204b. In this regard, parking receptacles 206a and 206b may have coupling features similar to those of respective vents 202a and 202b that allow vent plugs 204a and 204b to be removably secured to respective parking receptacles 206a and 206b. Although this example describes two sets of vents (202a, 202b), vent plugs (204a, 204b), and parking receptacles (206a, 206b), other embodiments may be configured with only a single vent, single plug, and single parking receptacle, or with greater numbers of vents, plugs, and parking receptacles.

In the above example, vents 202a and 202b are cylindrical structures having smooth cylindrical internal surfaces. In other embodiments, vents may be provided having various internal features. For example, vent 216 may be provided with an interior cylindrical surface having a non-uniform diameter. Vent 216, for example, may have a first interior diameter for a lower portion of the internal surface and a second interior diameter for an upper portion of the internal surface. The first interior diameter may be slightly smaller than the second interior diameter so that a cylindrical ledge (not shown) is formed at the boundary between the lower and upper portions of the internal surface. Vent 216, having such an internal seat, allows further components to be installed in vent 216. In an example embodiment, described below, additional components may be installed in vent 216 that allow diagnostic testing of the sealing properties of vent 216 when vent 216 is coupled with a corresponding vent plug (not shown), as described below with reference to FIGS. 16A and 16B.

Figure 3:
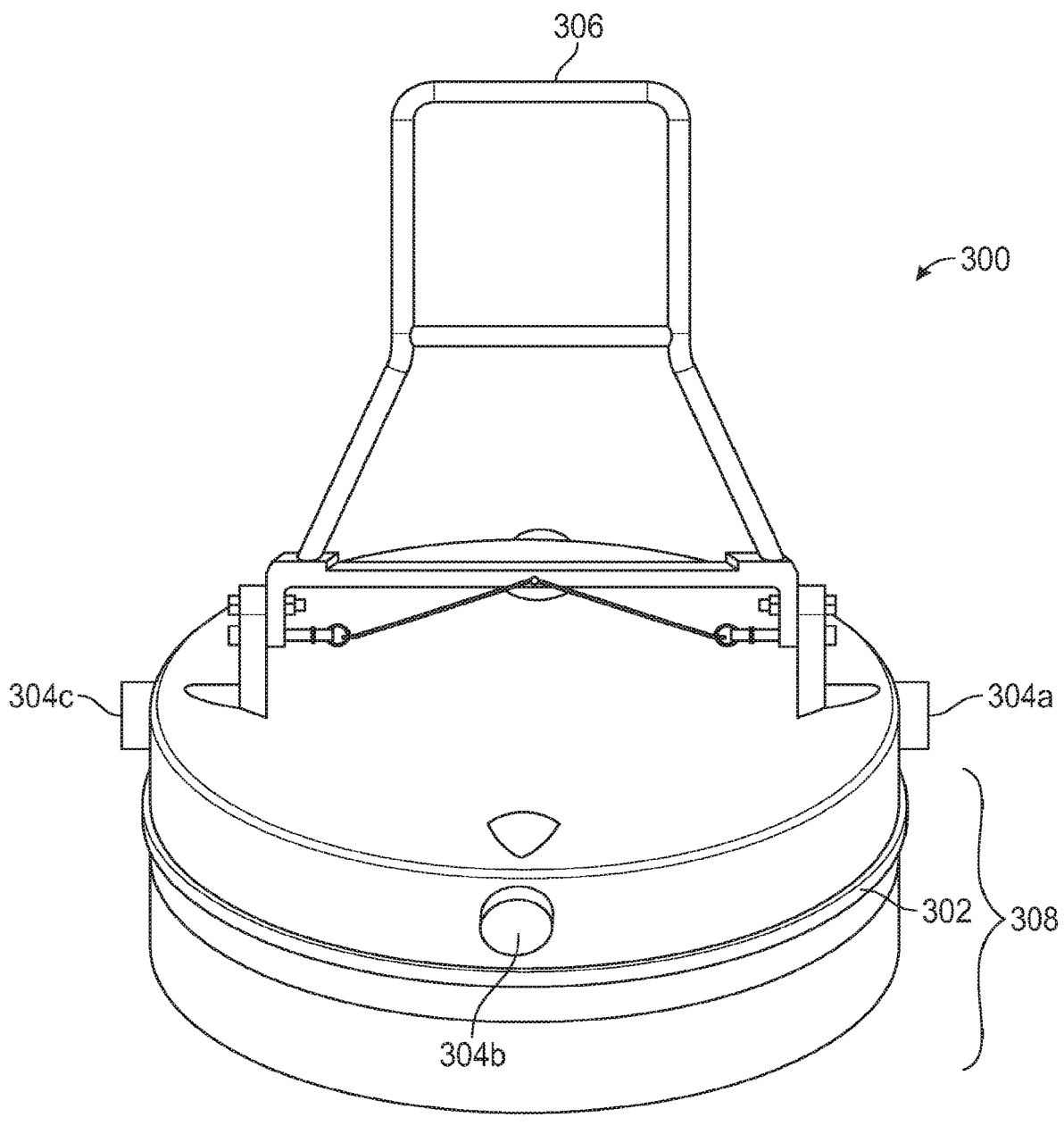
FIG. 3 is a three-dimensional view of a vent plug, in accordance with one or more embodiments of the disclosure.

FIG. 3 is a three-dimensional view of a vent plug 300, in accordance with one or more embodiments of the disclosure. As described in greater detail below, vent plug 300 has a rubber O-ring seal 302, and a plurality of coupling features 304a, 304b, and 304c. A further coupling feature is not shown in this view but is symmetrically placed with respect to coupling features 304a, 304b, and 304c. Vent plug 300 has a movable handle 306 that may be used to mechanically install vent plug 300 in a corresponding suction pile vent, as described in greater detail below. Movable handle 306 may be locked in an upright configuration, as shown, or may be movable side to side about an axis defined by points at which movable handle 306 is secured to vent plug 300. Vent plug 300 has a cylindrically shaped body 308 that is configured to be coupled within a corresponding cylindrically shaped internal surface of a suction pile vent to thereby form a watertight seal with the vent.

Figure 4A:
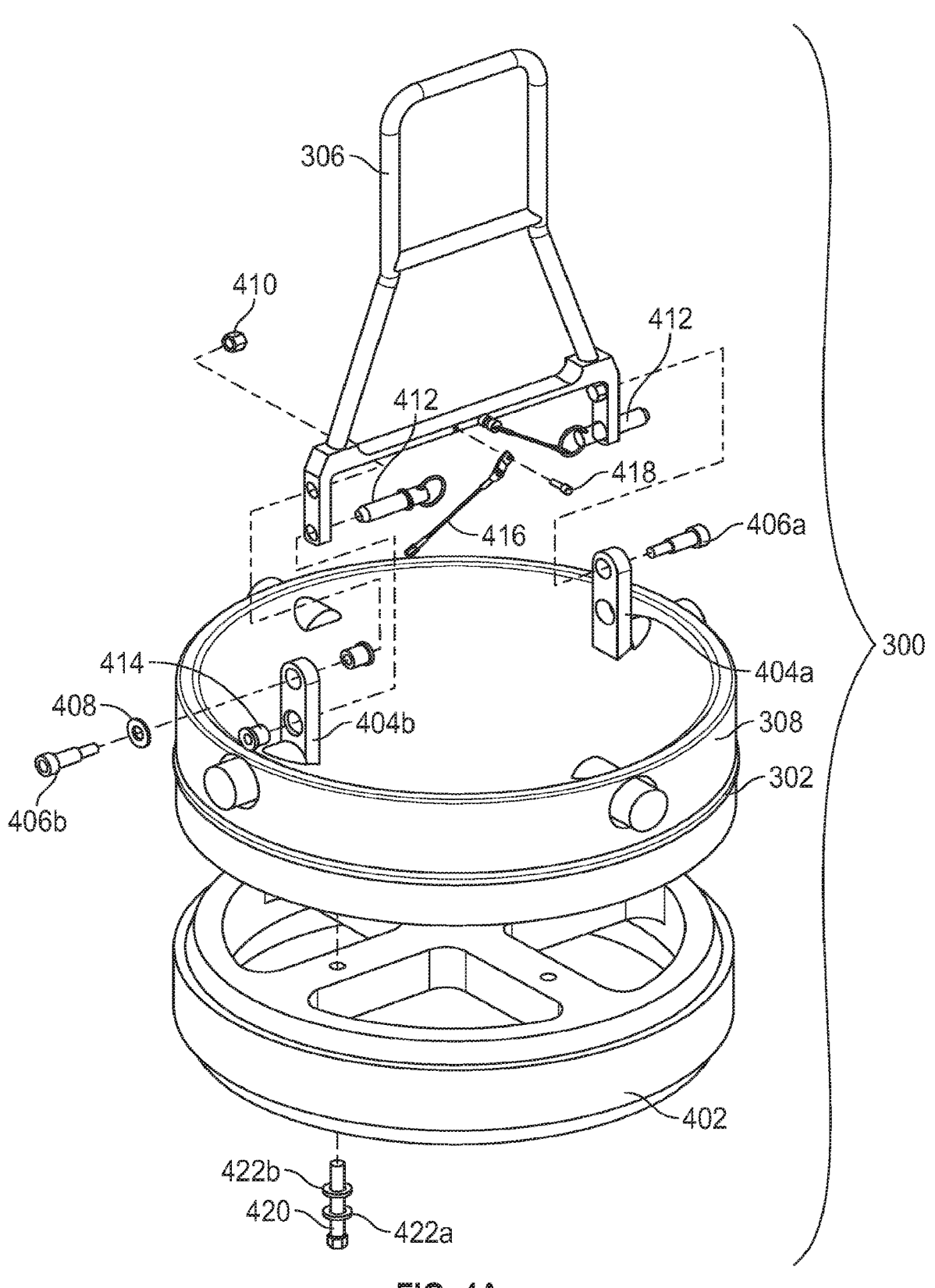
FIG. 4A is an exploded view of the vent plug shown in FIG. 3, in accordance with one or more embodiments of the disclosure.

FIG. 4A is an exploded view of vent plug 300 shown in FIG. 3, in accordance with one or more embodiments of the disclosure. In this example, vent plug 300 has a body 308 that is 24 inches in diameter that is attached to a vent plug nose 402. Vent plug seal 302 is seated in a groove (not shown) in vent plug body 308. Handle 306 is moveably attached to vent plug body 308. In this regard, handle 306 may be attached to coupling features 404a and 404b using screws 406a and 406b, washers 408, nuts 410, or any other suitable fasteners. Handle 306 may be locked in an upright configuration and secured with quick-release spring-loaded pins 412. Pins 412 may be engaged with corresponding flanged bushings 414. Lanyards 416 may be provided to engage pins 412. Lanyards 416 may be attached to pins 412 on one end and secured to handle 306 at another end with screws 418. Vent plug nose 402 may be fastened to vent plug body 308 with screws 420, and washers 422a and 422b.

Figures 4B, 4C, 4D:
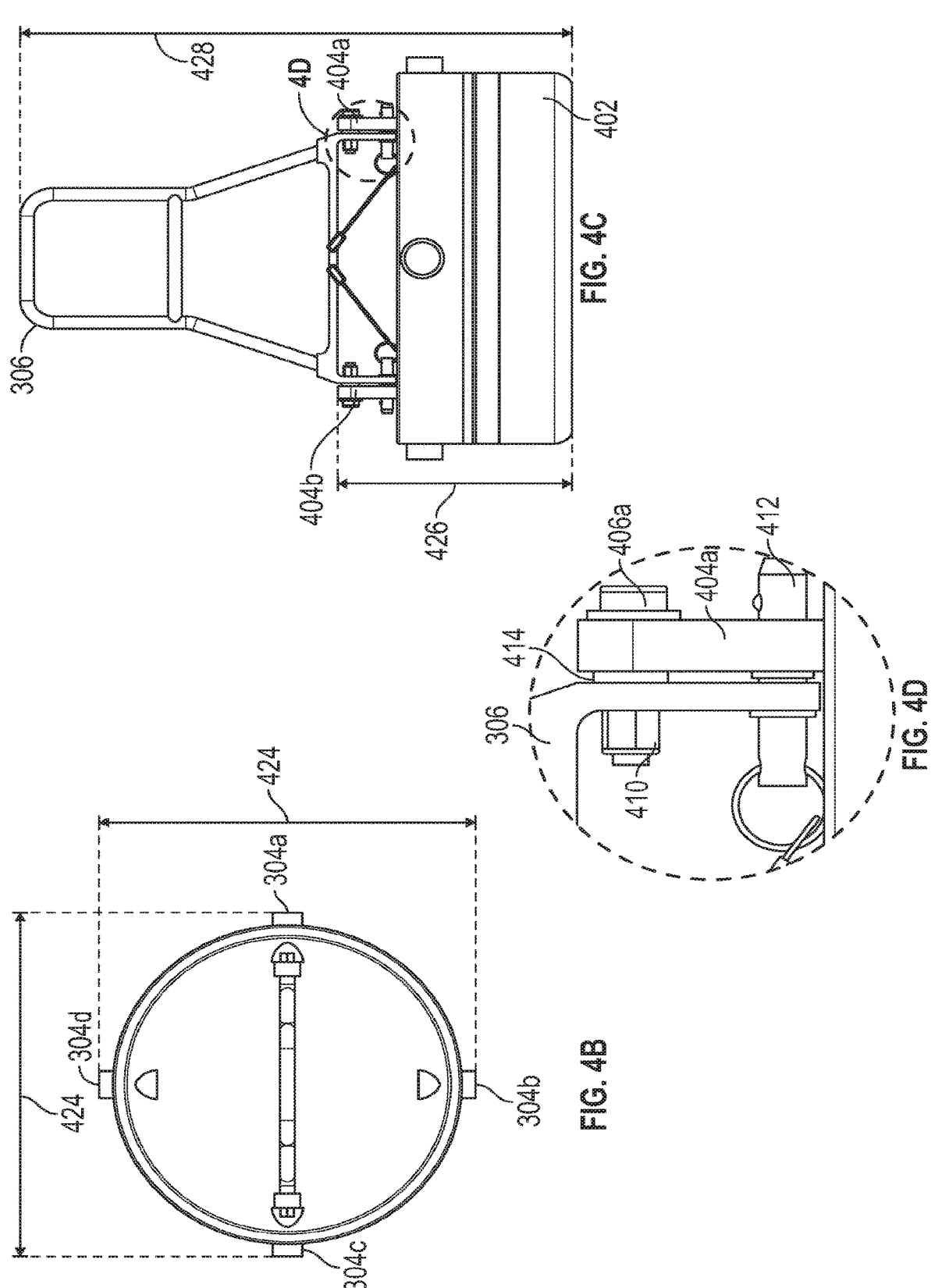
FIG. 4B is a top view of the vent plug shown in FIG. 3, in accordance with one or more embodiments of the disclosure.
FIG. 4C is a side view of the vent plug shown in FIG. 3, in accordance with one or more embodiments of the disclosure.
FIG. 4D is an enlarged side view of coupling features of the vent plug shown in FIG. 3, in accordance with one or more embodiments of the disclosure.

FIG. 4B illustrates a top view of vent plug 300 shown in FIGS. 3 and 4A, in accordance with one or more embodiments of the disclosure. Vent plug 300 may a distance 424 between opposite coupling features 304a and 304c, and between opposite coupling features 304b and 304d. In this example, distance 424 may have a value of 24 and ⅜ inches. Other embodiments may have other dimensions for comparable features.

FIG. 4C is a side view of vent plug 300 shown in FIG. 3, in accordance with one or more embodiments of the disclosure. Vent plug 300 may have a distance 426 between the bottom of vent plug nose 402 and the top of coupling features 404a and 404b. In this example, distance 426 may have a value of 12 and $^{15}/_{16}$ inches. Vent plug 300 may have a distance 428 between the bottom of vent plug nose 402 and the top of handle 306. In this example, distance 426 may have a value of 30 and $^7/_{16}$ inches. Other embodiments may have other dimensions for comparable features.

FIG. 4D is an enlarged side view of coupling features 404a of vent plug 300 shown in FIG. 3, in accordance with one or more embodiments of the disclosure. As shown, a portion of handle 306 is secured to coupling feature 404a with screw 406a, bushing 414, and nut 410. Spring-loaded pin 412 makes a removable mechanical connection between handle 306 and coupling feature 404a, thereby locking handle 306 in a vertical configuration.

Figure 5A:
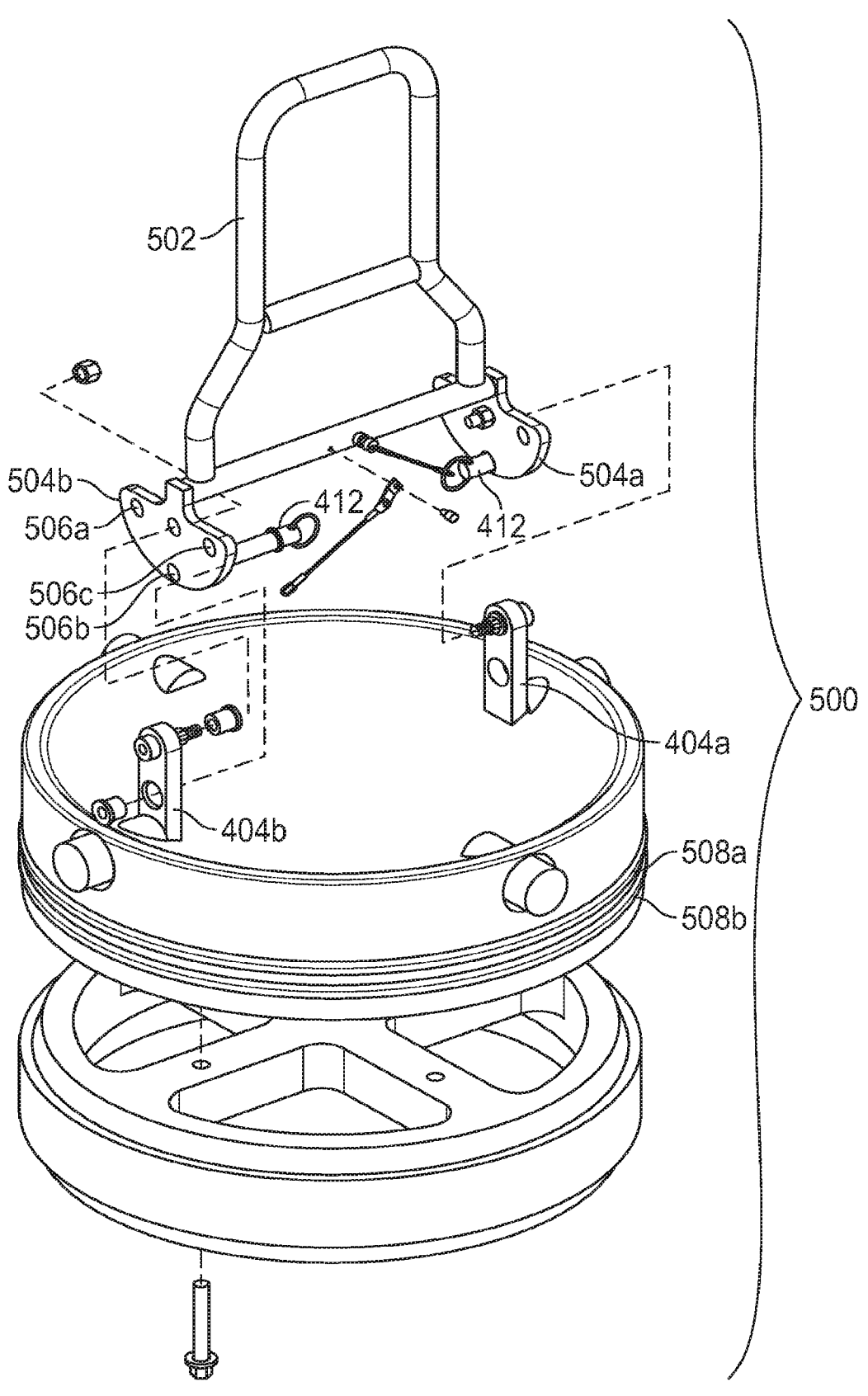
FIG. 5A is an exploded view of a vent plug, in accordance with one or more embodiments of the disclosure.

FIG. 5A is an exploded view of a vent plug 500, in accordance with one or more embodiments of the disclosure. In this example, vent plug 500 has features similar to those found in vent plug 300 shown in FIGS. 3 and 4A to 4D. In contrast to vent plug 300, described above, vent plug 500 has a handle 502 that is configured to be locked in three separate positions. For example, vent plug 500 may be locked in an upright configuration (as shown in FIG. 5A) as was the case with vent plug 300. Vent plug 500 may further be locked on two horizontal configurations as shown in FIGS. 9G and 9H and described below with the related description of methods of coupling of vent plug 500 to a suction pile vent (e.g., suction pile vents 202a and 202b of FIG. 1, and related example vents described below).

Vent handle 502 is configured with coupling features 504a and 504b. Each of coupling features 504a and 504b has three holes that may engage with pins 412 to secure handle 502 in respective positions. For example, coupling feature 504b has holes 506a, 506b, and 506c. By turning handle 502 so that pin 412 engages hole 506a, handle 502 may be locked in a first horizontal configuration. By turning handle 502 so that pin 412 engages hole 506b, handle 502 may be locked in a vertical position. Similarly, turning handle 502 so that pin 412 engages hole 506c, handle 502 may be locked in a second horizontal configuration. Vent plug 500 is further configured with a seal having two O-rings 508a and 508b. Other features illustrated in FIG. 5 that are not specifically described are similar to features shown in FIG. 4A, as described above.

Figures 5B, 5C, 5D:
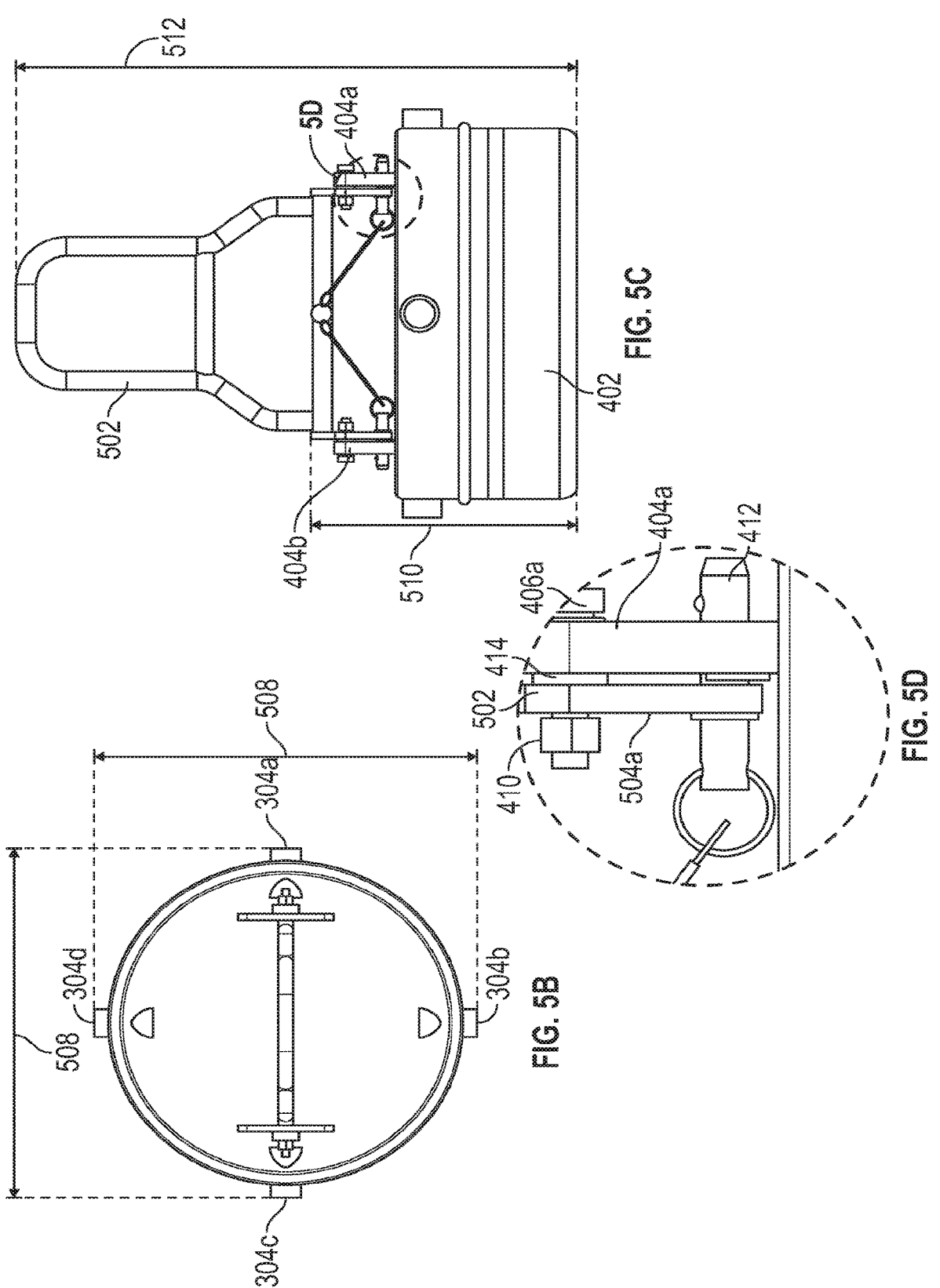
FIG. 5B illustrates a top view of the vent plug shown in FIG. 5A, in accordance with one or more embodiments of the disclosure.
FIG. 5C is a side view of the vent plug shown in FIG. 5A, in accordance with one or more embodiments of the disclosure.
FIG. 5D is an enlarged side view of coupling features of the vent plug shown in FIG. 5A, in accordance with one or more embodiments of the disclosure.

FIG. 5B illustrates a top view of vent plug 500 shown in FIG. 5A, in accordance with one or more embodiments of the disclosure. Vent plug 500 may a distance 508 between opposite coupling features 304a and 304c, and between opposite coupling features 304b and 304d. In this example, distance 508 may have a value of 24 and $^3/_8$ inches. These dimensions are similar to those of vent plug 300 shown in FIG. 4B. Other embodiments may have other dimensions for comparable features.

FIG. 5C is a side view of vent plug 500 shown in FIG. 5A, in accordance with one or more embodiments of the disclosure. Vent plug 500 may have a distance 510 between the bottom of vent plug nose 402 and the top of coupling features 404a and 404b. In this example, distance 510 may have a value of 13 and $^3/_4$ inches. Vent plug 500 may have a distance 512 between the bottom of vent plug nose 402 and the top of handle 502. In this example, distance 512 may have a value of 31 and $^1/_8$ inches. Other embodiments may have other dimensions for comparable features.

FIG. 5D is an enlarged side view of coupling features of vent plug 500 shown in FIG. 5, in accordance with one or more embodiments of the disclosure. As shown, a portion of handle 502, with coupling feature 504a, is secured to coupling feature 404a with screw 406a, bushing 414, and nut 410. Spring-loaded pin 412 makes a removable mechanical connection between coupling feature 504a of handle 502 and coupling feature 404a, thereby locking handle 502 in a vertical configuration, or in one of the two horizontal configurations, described above.

Figures 6A, 6B:
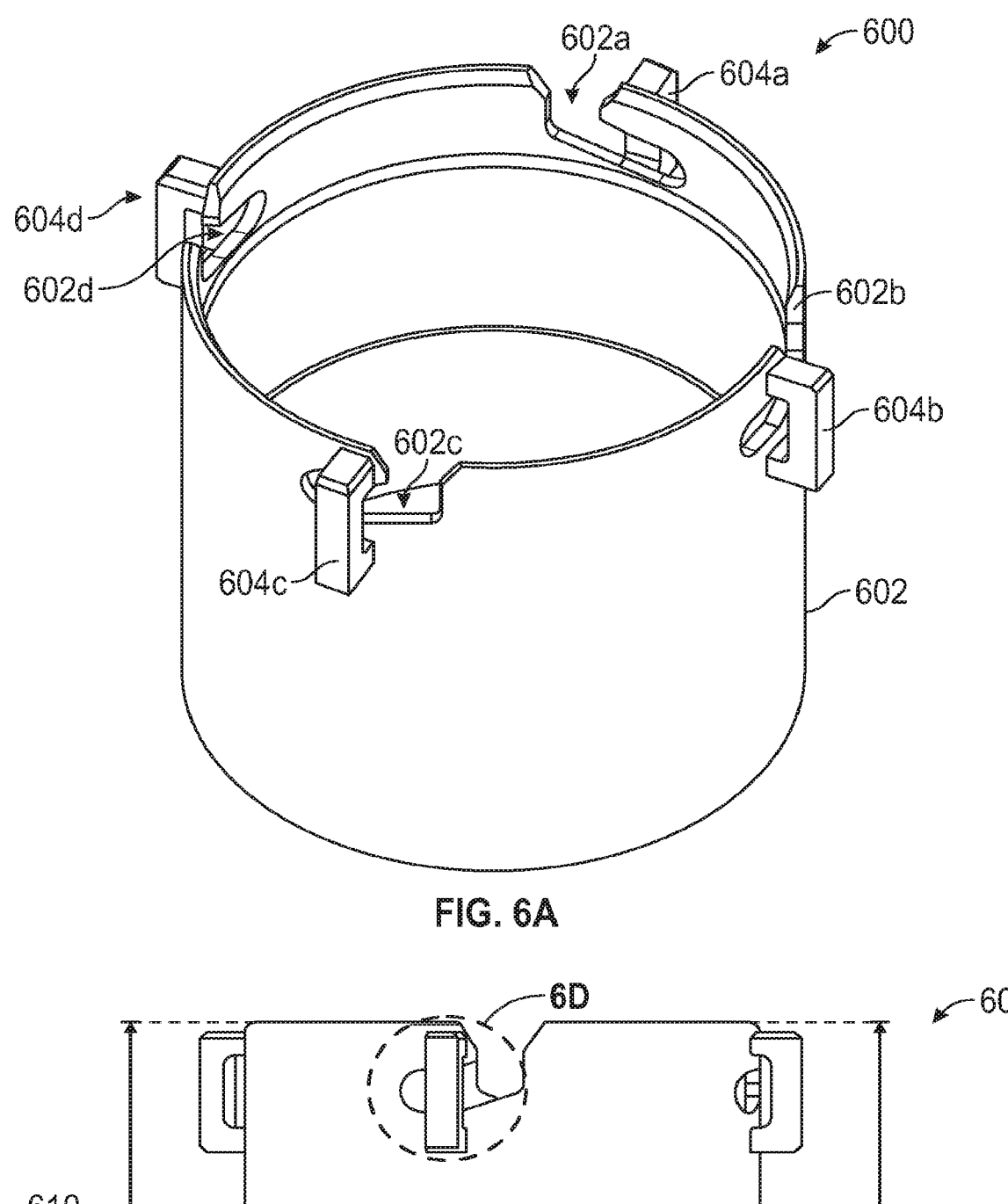
FIG. 6A is a three-dimensional view of a suction pile vent, in accordance with one or more embodiments of the disclosure.
FIG. 6B is a side view of the suction pile vent shown in FIG. 6A, in accordance with one or more embodiments of the disclosure.

FIG. 6A is a three-dimensional view of a suction pile vent 600, in accordance with one or more embodiments of the disclosure. In this example, suction pile vent 600 has a body 602 that is essentially a cylindrical shell. Suction pile vent 600 has four coupling features. In this regard, suction pile vent 600 has four J-holes 602a, 602b, 602c, and 602d, and four corresponding braces 604a, 604b, 604c, and 604d. J-holes 602a to 602d, and braces 604a to 604d, are configured to couple with corresponding coupling features of a vent plug. For example, vent plug 300 or vent plug 500 may be installed in vent 600 by lowering the body of vent plug 300 or vent plug 500 into vent plug body 602 such that coupling features 304a to 304d, of vent plug 300 or 500, engage with corresponding J-holes 602a to 602d of vent 600. Vent plug 300 or 500 may then be twisted such that coupling features 304a to 304d move into respective J-holes 602a to 602d. Braces 604a to 604d then provide protection for coupling features 304a to 304d while vent plug 300 or 500 is installed in suction pile vent 600.

FIG. 6B is a side view of the suction pile vent 600 shown in FIG. 6A, in accordance with one or more embodiments of the disclosure. Suction pile vent 600 may have a height 606 measured along an axial direction of suction pile vent 600. In this example, suction pile vent 600 may include a small tolerance 608 allowing for welding attachment of suction pile vent 600 to a suction pile. For typical welding operations, tolerance 608 may be about 2 inches. A distance 610 between the top of suction pile vent 600 and a weld bead may greater than or equal to 22 inches to avoid thermally induced warping of suction pile vent 600. Thus, in this example, height 606 may be greater than or equal to 24 inches. Coupling features identified by circled region marked "A" are described below with reference to FIG. 6D.

FIG. 6C is a top view of suction pile vent 600 shown in FIG. 6A, in accordance with one or more embodiments of the disclosure. Suction pile vent 600 may have a distance 612 between opposite braces 604a and 604c, and between opposite braces 604b and 604d. In this example, distance 612 may have a value of 28.3 inches. Other embodiments may have other dimensions for comparable features.

FIG. 6D is an enlarged view of coupling features of suction pile vent 600 shown in FIG. 6A, in accordance with one or more embodiments of the disclosure. In this regard, FIG. 6D illustrates details of one J-hole (e.g., J-hole 602a) and one corresponding brace (e.g., brace 604a). As shown, typical dimensions range from a fraction of an inch to several inches. Other embodiments may have other dimensions for comparable features.

Figures 7B, 7C:
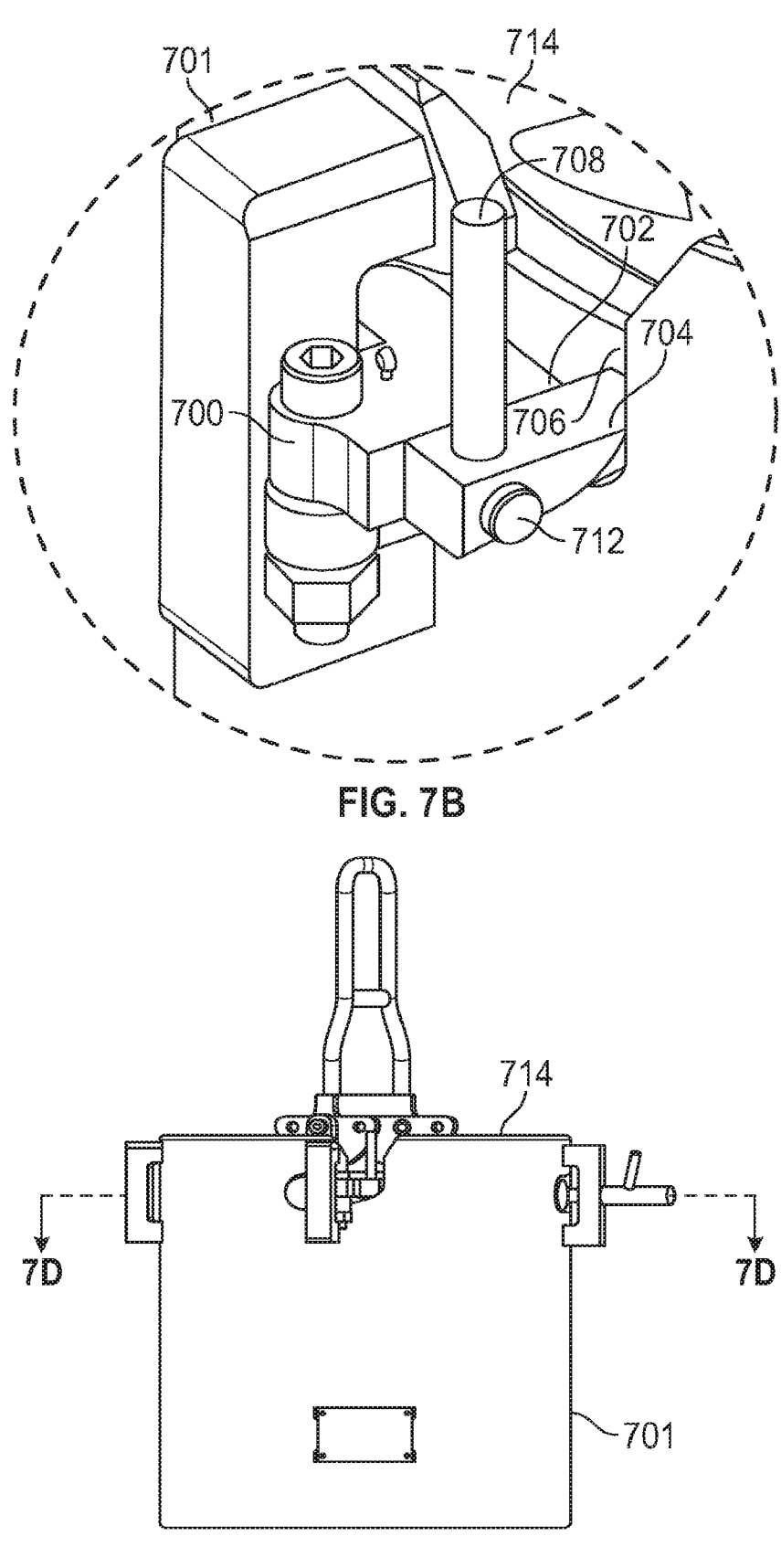
FIG. 7B is a three-dimensional view of a latching and locking mechanism of a suction pile vent in a second configuration, in accordance with one or more embodiments of the disclosure.
FIG. 7C is a side view of a suction pile vent with installed vent plug, in accordance with one or more embodiments of the disclosure.

FIG. 7A is a three-dimensional view of a latching and locking mechanism 700 of a suction pile vent 701 in a first configuration, in accordance with one or more embodiments of the disclosure. Latching and locking mechanism 700 may include a movable latch element 702 and a movable lock element 704. FIG. 7A shows latching and locking mechanism 700 in a configuration in which latch element 702 is moved into a J-hole 706 while locking element 704 is moved out of J-hole 706. A handle 708 may be moved to rotate latching and locking mechanism 700 along a first axis 710 to move latch element 702 out of J-hole 706, as described in greater detail below with reference to FIGS. 7D and 7E. Handle 708 may also be moved to rotate latching and locking mechanism 700 along a second axis 712 to thereby rotate locking element 704 into J-hole 706, as described in greater detail below with reference to FIGS. 7B, 7E, and 7F. Once locking element 704 has been moved into J-hole 706, suction pile vent plug 714 may be locked in suction pile vent 701, as described in greater detail below.

FIG. 7B is a three-dimensional view of latching and locking mechanism 700 of suction pile vent 701 in a second configuration, in accordance with one or more embodiments of the disclosure. In this configuration, handle 708 has been moved to rotate latching and locking mechanism 700 along second axis 712 to thereby rotate locking element 704 into J-hole 706. In this configuration, suction pile vent plug 714 may be locked in suction pile vent 701. Further details of the operation of latching and locking mechanism 700 are described below with reference to FIGS. 7C, 7D, 7E, and 7F.

Figures 7D, 7E, 7F:
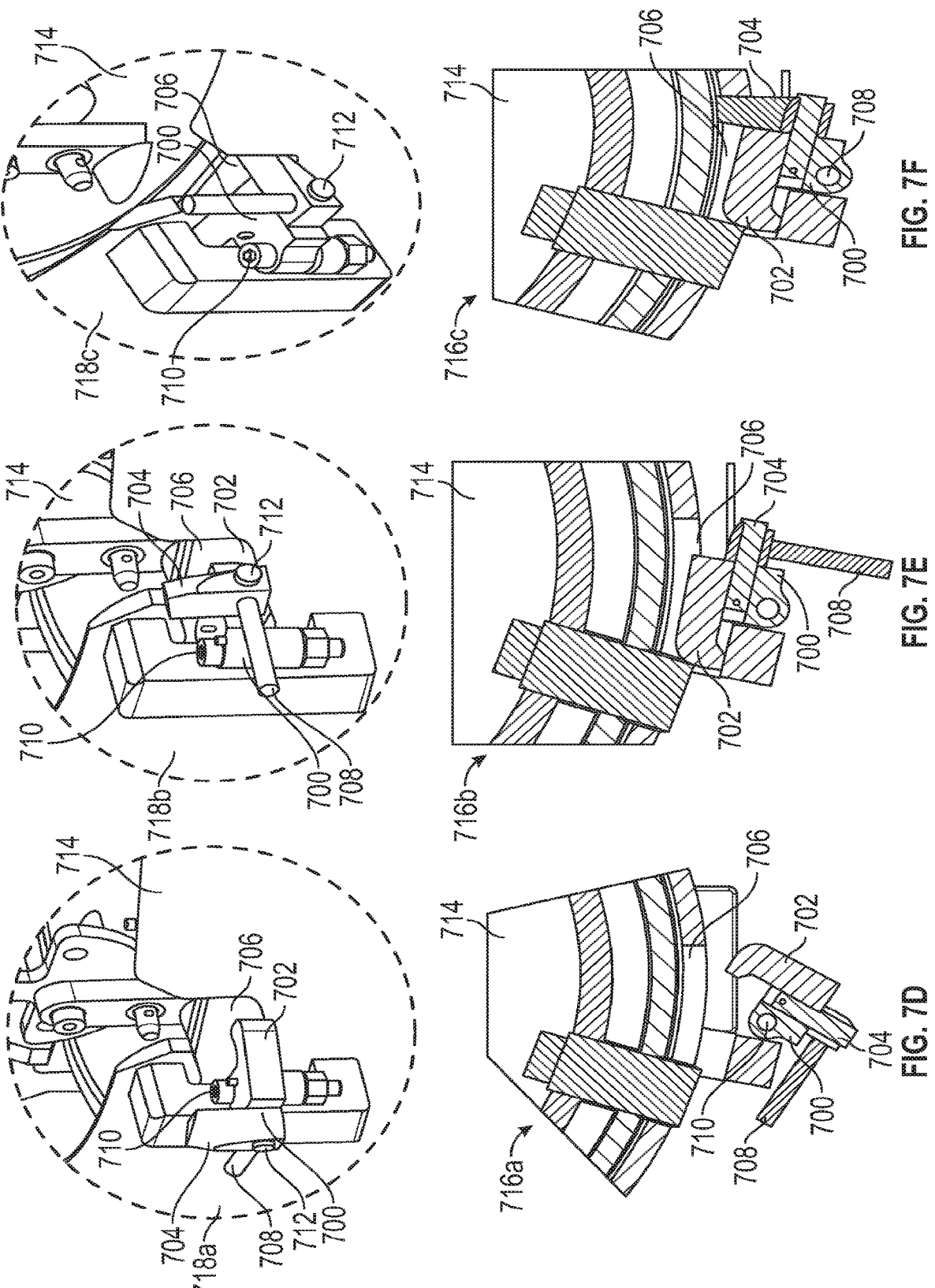
FIG. 7D shows a first configuration of the latching and locking mechanism of FIGS. 7A and 7B, in accordance with one or more embodiments of the disclosure.
FIG. 7E shows a second configuration of the latching and locking mechanism of FIGS. 7A and 7B, in accordance with one or more embodiments of the disclosure.
FIG. 7F shows a third configuration of the latching and locking mechanism of FIGS. 7A and 7B, in accordance with one or more embodiments of the disclosure.

FIG. 7C is a side view of suction pile vent 701 with installed vent plug 714, in accordance with one or more embodiments of the disclosure. FIGS. 7D, 7E, and 7F show three configurations of latching and locking mechanism 700. In this regard, FIGS. 7D, 7E, and 7F, respectively show top cross-sectional views 716a, 716b, and 716c, as defined by cross-sectional cut A-A indicated in FIG. 7C. Similarly, FIGS. 7D, 7E, and 7F, respectively show three-dimensional inset views 718a, 718b, and 718c, which are similar to the three-dimensional views of FIGS. 7A and 7B. In FIG. 7D both latching element 702 and locking element 704 are withdrawn from J-hole 706.

Changing from the configuration of FIG. 7D to the configuration 7E may be performed as follows. Handle 708 may be moved to rotate latching and locking mechanism 700 about first axis 710 to thereby rotate latching element 702 into J-hole 706. In this regard, FIG. 7E is similar to FIG. 7A after the above-described operation has been carried out. Next, changing from the configuration of FIG. 7E to the configuration of FIG. 7F may be performed as follows. Handle 708 may be moved to rotate latching and locking mechanism 700 about second axis 712 to thereby rotate locking element 704 into J-hole 706. The result of the above-described two operations is to render latching and locking mechanism 700 in the configuration shown in FIG. 7F. In this configuration, suction pile vent plug 714 may be locked in suction pile vent 701.

Figure 8A:
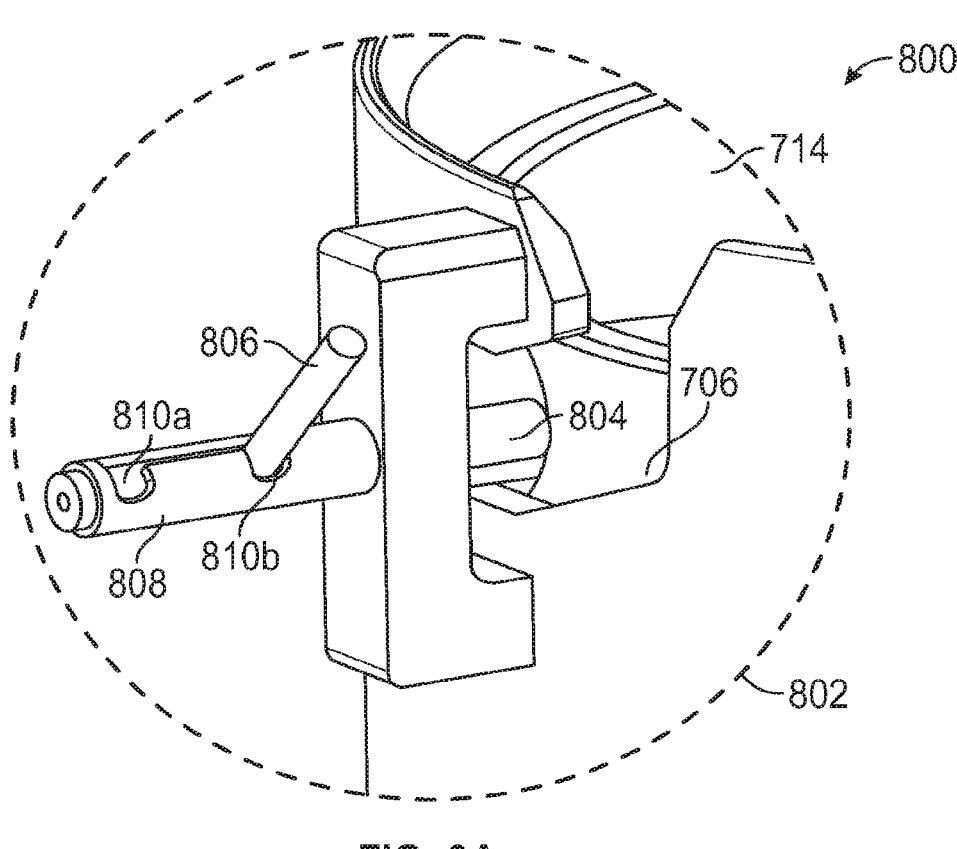
FIG. 8A is a three-dimensional view of a locking mechanism of a suction pile vent, in accordance with one or more embodiments of the disclosure.

FIG. 8A is a three-dimensional view of a locking mechanism 800 of a suction pile vent 802, in accordance with one or more embodiments of the disclosure. Locking mechanism 800 has a retractable pin 804 with a handle 806. Retractable pin 804 is configured to be slidably movable within a support structure 808. Support structure 808 has two semicircular cut regions 810a and 810b. In this example, pin 804 is shown in a configuration in which it is engaged within J-hole 706 which acts to lock suction pile vent plug 714 in place. Retractable pin 804 may be withdrawn from J-hole 706 by moving handle 806 to rotate pin 804 so that handle 806 become disengaged from semi-circular cut 810b of support structure 808. Handle 806 may then be moved to slide pin 804 out of J-hole 706. The reverse operation of moving pin 804 into J-hole 706 is described below with reference to FIGS. 8B, 8C, and 8D.

Figure 8B:
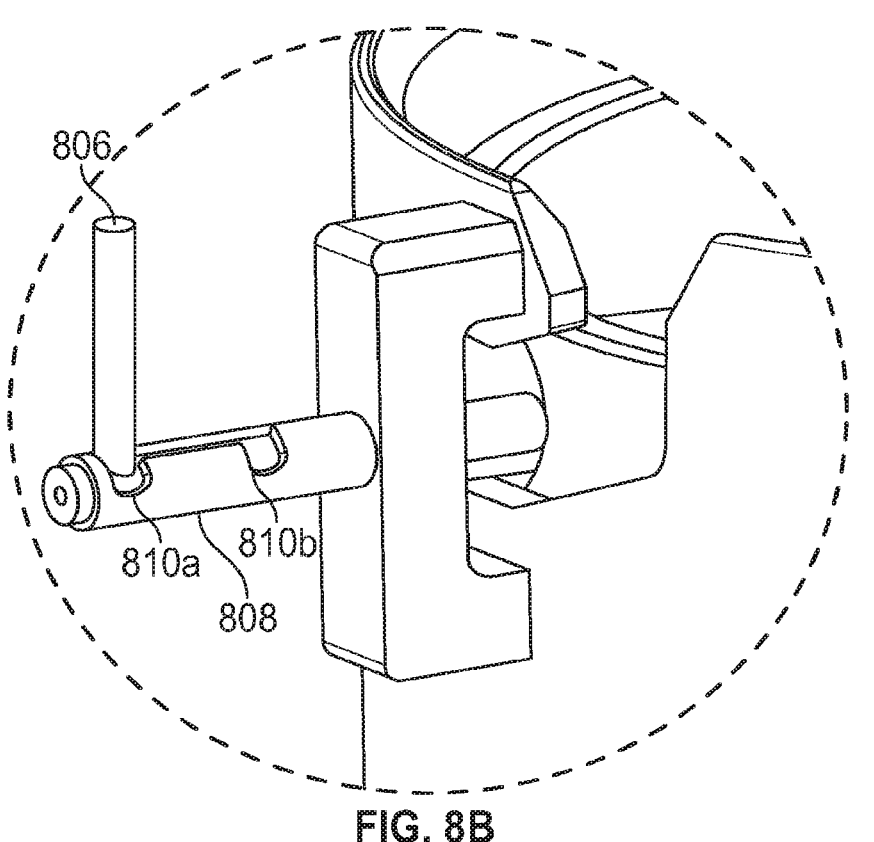
FIG. 8B is a three-dimensional view of a first configuration of the locking mechanism shown in FIG. 8A.
Figure 8C:
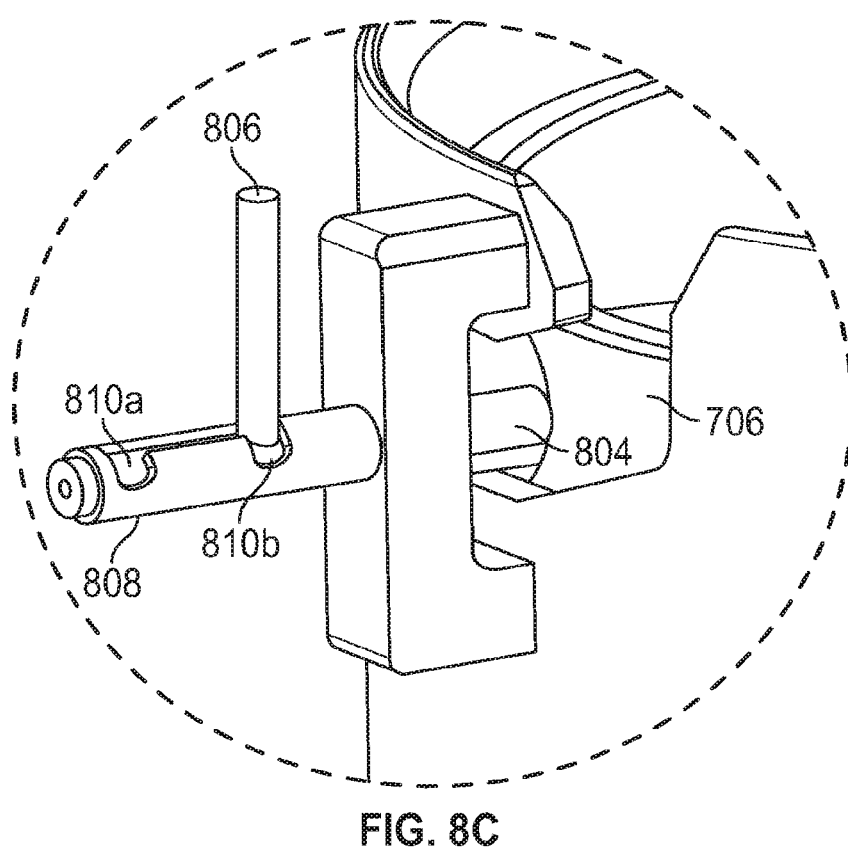
FIG. 8C is a three-dimensional view of a second configuration of the locking mechanism shown in FIG. 8A.

FIG. 8B shows locking mechanism 800 in a retracted configuration with handle 806 rotated slightly to not be engaged with cut region 810a, in accordance with one or more embodiments of the disclosure. FIG. 8C shows handle

Figure 8D:
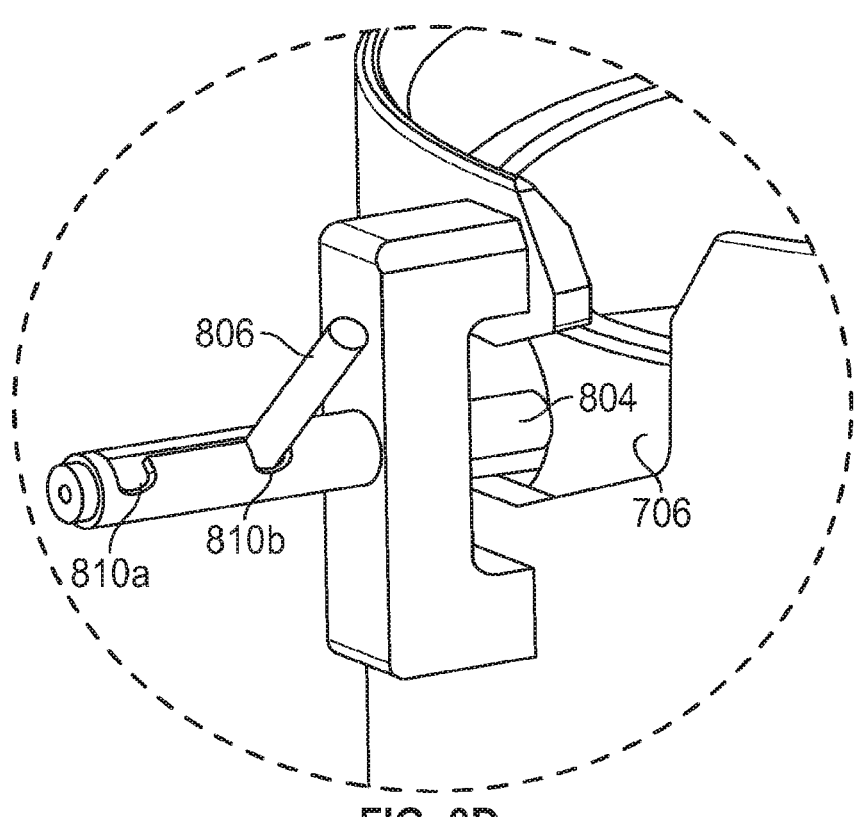
FIG. 8D is a three-dimensional view of a third configuration of the locking mechanism shown in FIG. 8A.

806 after it has been moved to a second position in which pin 804 is engaged with J-hole 706. Handle is still held in a rotated configuration and is not engaged with cut region 810b in FIG. 8C. In FIG. 8D, handle 806 has been rotated to engage with cut region so that pin 804 is engaged with J-hole 706 in a locked configuration. In a further embodiment, pin 804 and handle 806 may be spring loaded so that handle remains engaged in cut region 810b in a locked configuration, that resists rotation of handle 806.

Figures 8E, 8F, 9A, 9B:
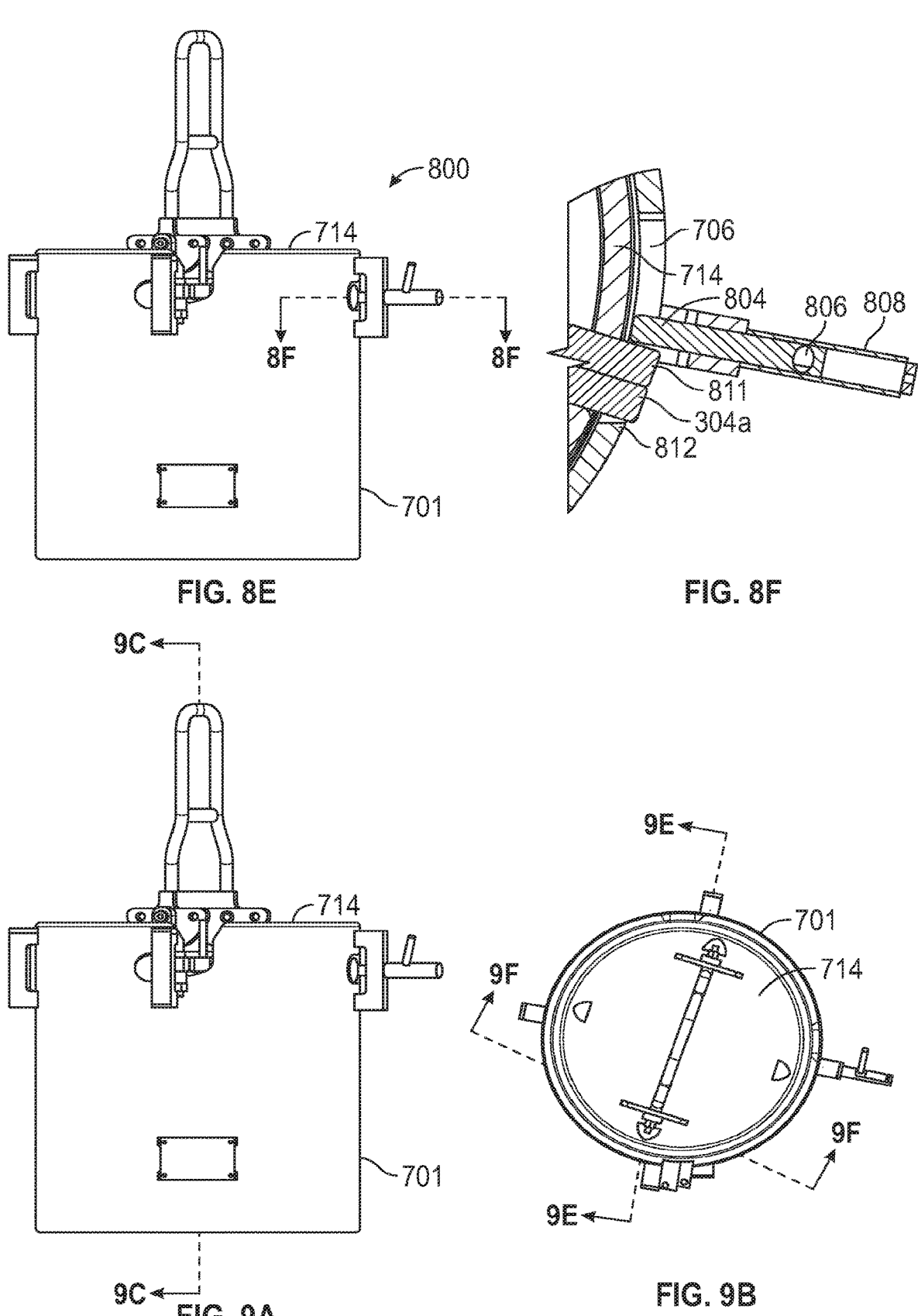
FIG. 8E is a side view of a suction pile vent with installed vent plug and the locking mechanism of FIG. 8A, in accordance with one or more embodiments of the disclosure.
FIG. 8F is a cross-sectional view of a locked configuration of the locking mechanism shown in FIG. 8A.
FIG. 9A is a side view of a suction pile vent with installed vent plug, in accordance with one or more embodiments of the disclosure.
FIG. 9B is a top view of a suction pile vent with installed vent plug, in accordance with one or more embodiments of the disclosure.

FIG. 8E is a side view of suction pile vent 701 with installed vent plug 714 and locking mechanism 800 of FIG. 8A, in accordance with one or more embodiments of the disclosure. FIG. 8E defines a cross-sectional slice as indicated by the section D-D.

FIG. 8F is a cross-sectional view of a locked configuration of the locking mechanism shown in FIG. 8A, in accordance with one or more embodiments of the disclosure. The cross sectional view of FIG. 8F is defined by section D-D of FIG. 8E. FIG. 8F shows pin 804 fully engaged within J-hole 706 and touching an edge 811 of suction pile vent plug 714. In this configuration, coupling feature 304a is confined on one side by an edge 812 of J-hole 706 and on another side by the presence of pin 804 making contact with edge 811. In this way, coupling feature 304a is held in a locked position. As such, suction pile plug 714 is locked to suction pile vent 701.

Figures 9C, 9D:
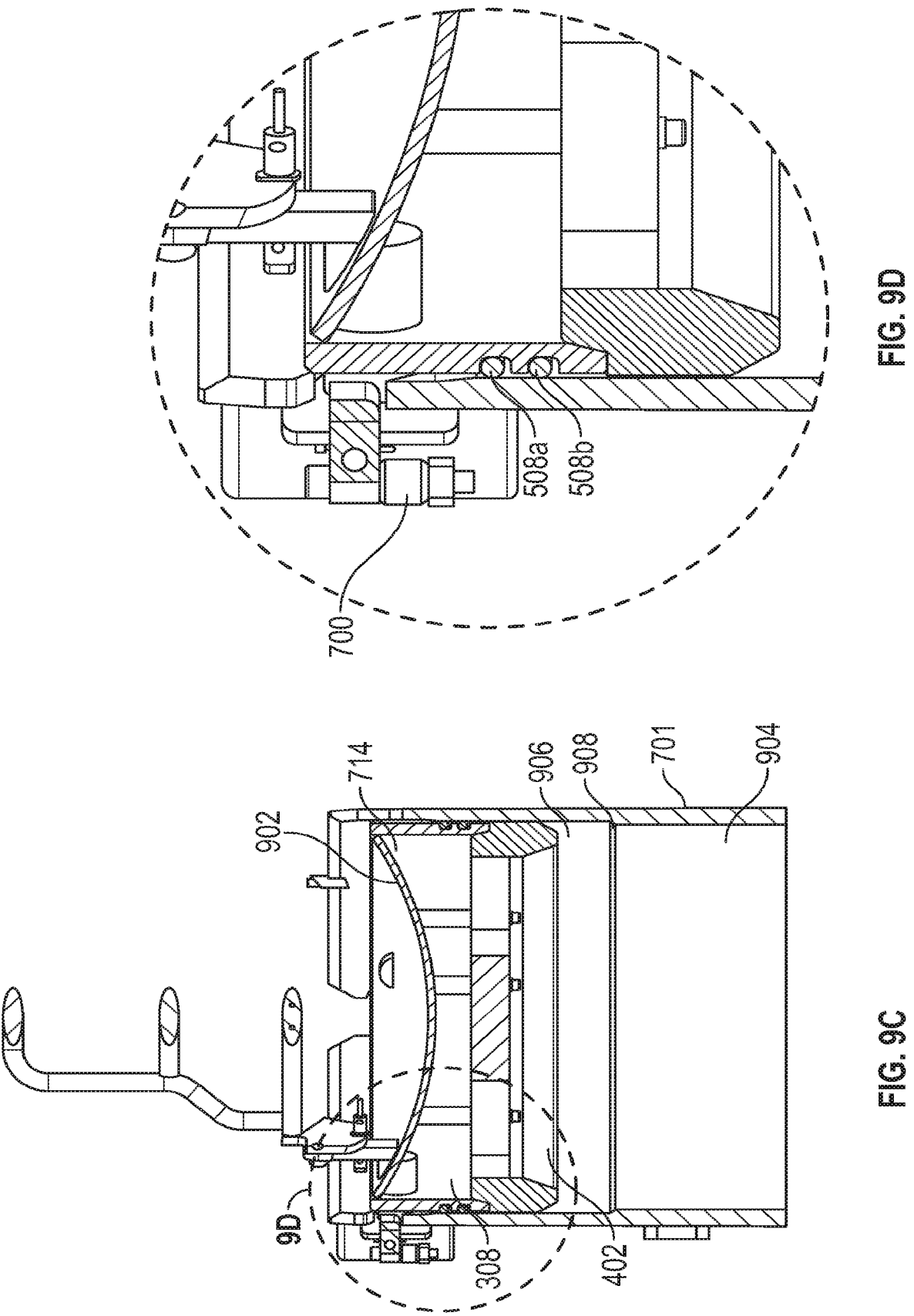
FIG. 9C is a cross-sectional view of the suction pile vent with installed vent plug shown in FIG. 9A, in accordance with one or more embodiments of the disclosure.
FIG. 9D is a cross-sectional view of the suction pile vent with installed vent plug shown in FIG. 9A, in accordance with one or more embodiments of the disclosure.
Figures 9E, 9F:
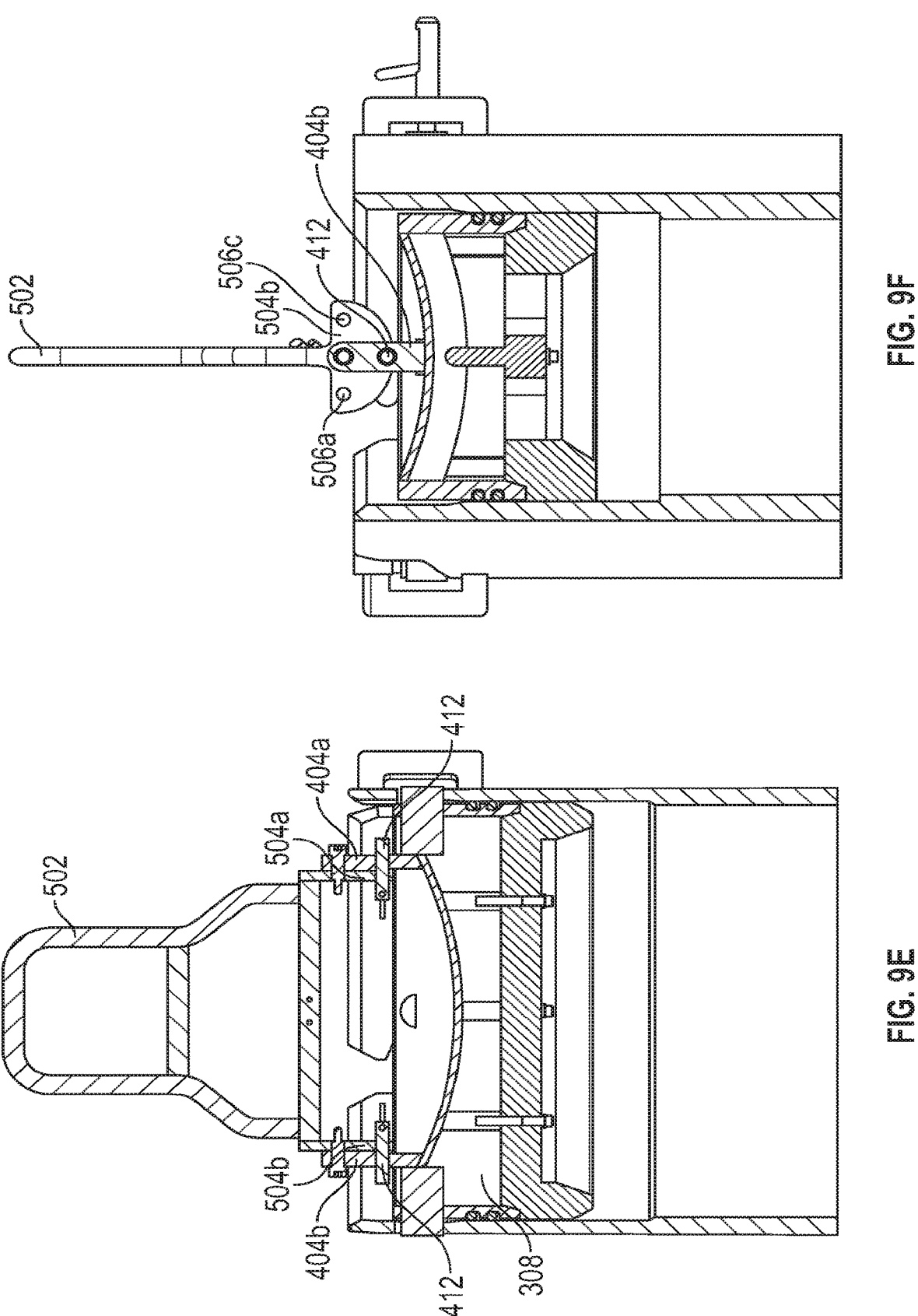
FIG. 9E is a cross-sectional view of the suction pile vent with installed vent plug shown in FIG. 9B, in accordance with one or more embodiments of the disclosure.
FIG. 9F is a cross-sectional view of the suction pile vent with installed vent plug shown in FIG. 9B, in accordance with one or more embodiments of the disclosure.
Figures 9G, 9H:
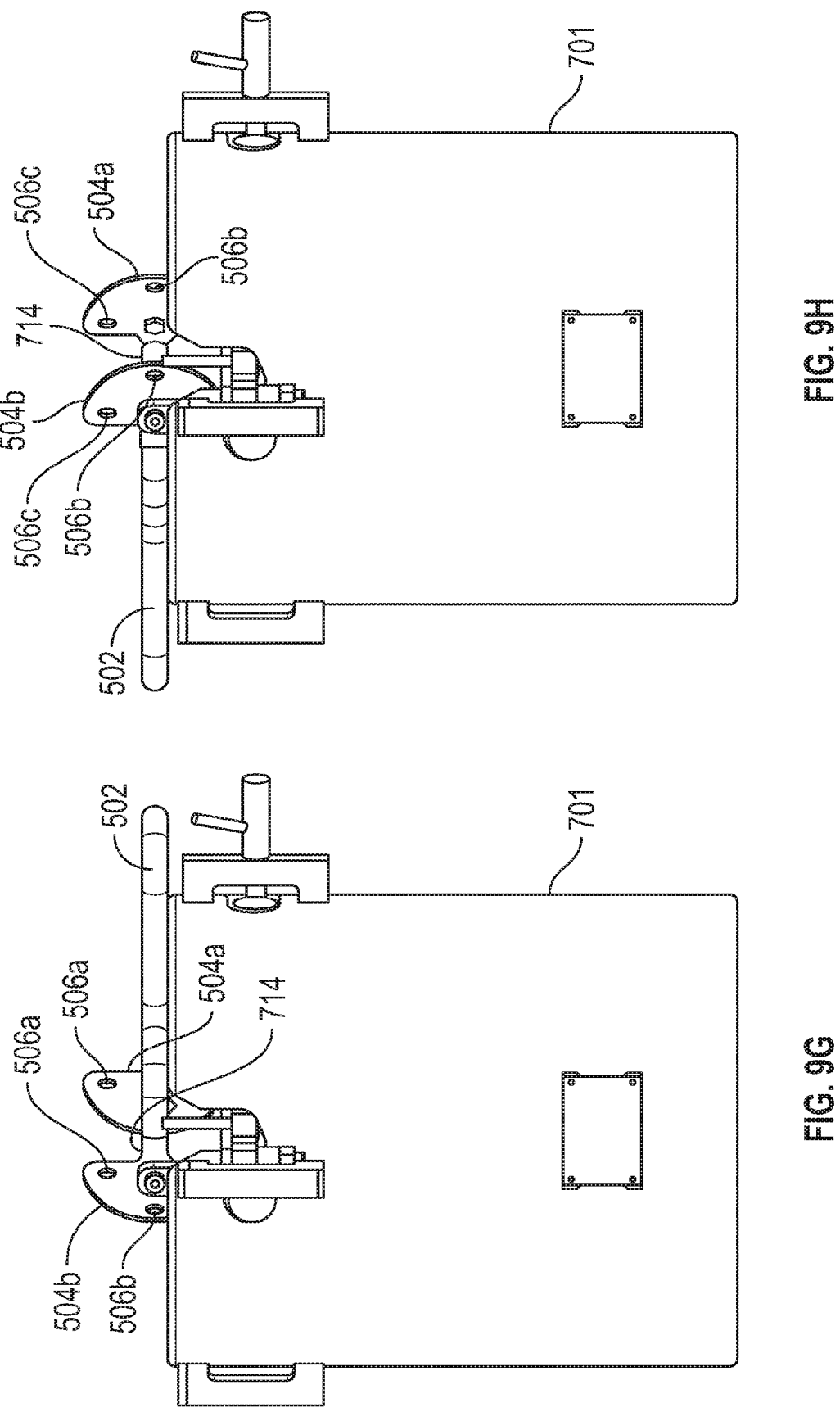
FIG. 9G is a side view suction pile vent with installed vent plug in a first configuration, in accordance with one or more embodiments of the disclosure.
FIG. 9H is a side view suction pile vent with installed vent plug in a second configuration, in accordance with one or more embodiments of the disclosure.

FIGS. 9A to 9F show various views of suction pile vent 701 with installed vent plug 714, in accordance with one or more embodiments of the disclosure. FIG. 9A shows a side view, and FIG. 9B shows a top view, of suction pile vent 701 with installed vent plug 714. The cross-sectional views of FIGS. 9C and 9D are defined by the section E-E shown in FIG. 9A. The cross-sectional view of FIG. 9E is defined by the section F-F, and the cross-sectional view of FIG. 9F is defined by the section G-G, shown in FIG. 9B

FIG. 9C illustrates details of suction pile vent 701 with installed vent plug 714, and defines an inset region H that is enlarged in the view of FIG. 9D, in accordance with one or more embodiments of the disclosure. As shown in FIGS. 9C and 9D, for example, vent plug 714 is configured to make close contact with walls of suction pile vent 701 to thereby form a watertight seal between vent plug 714 and vent 701. Vent plug 714 has a body 308 and a vent plug nose 402 as also shown, for example, in FIGS. 4A and 5A. Vent plug nose 402 has open channels that allow water to make contact with a convex surface 902 of vent plug body 308. The curved convex surface 902 of vent plug body 308 distributes forces due to water pressure much like an arch distributes load forces in a bridge.

As described above with reference to FIG. 2, suction pile vent 701 may have a first region 904 having a first interior diameter and a second region 906 having a second interior diameter. The first interior diameter of first region 904 may be slightly smaller than the second interior diameter of second region 906 so that a cylindrical ledge (or seat) 908 is formed at the boundary between the first 904 and second 906 regions of the internal surface. As mentioned above, the presence of the cylindrical ledge 908 allows diagnostic testing equipment to be installed to test the integrity of the seal formed between suction pile vent 701 and vent plug 714, as described in greater detail below with reference to FIGS. 16A and 16B.

FIG. 9D shows an enlarged view of the detail region H of FIG. 9C showing latching and locking mechanism 700 and O-rings 508a and 508b, in accordance with one or more embodiments of the disclosure. In this example, vent plug 714 is similar to vent plug 500 of FIG. 5A.

FIG. 9E shows another cross section view that emphasizes details of the locking mechanism for handle 502 described above with reference to FIG. 5A, in accordance with one or more embodiments of the disclosure. This view shows a cross-sectional view of coupling features 404a and 404b of vent plug body 308 respectively engaging coupling features 504a and 504b of handle 502. As described above with reference to FIG. 5A, handle 502 may be locked in various positions when pins 412 are engaged with respective holes in coupling features 504a and 504b of handle 502. Further details of this locking mechanism are shown in FIG. 9F, as described below.

FIG. 9F shows a cross-sectional view of pile vent 701 with installed vent plug 714 that is rotated about a vertical axis relative to the cross-sectional view of FIG. 9E, in accordance with one or more embodiments of the disclosure. FIG. 9F shows handle 502 in a vertical locked configuration. Coupling feature 504b is shown in a configuration in which holes 506a and 506c are visible. Hole 506b is obscured from this view because, in the vertical locked position (shown), hole 506b is engaged with pin 412 of coupling feature 404b.

FIGS. 9G and 9H present side views suction pile vent 701 with installed vent plug 714 in respective first and second configurations, in accordance with one or more embodiments of the disclosure. FIG. 9G shows handle 502 locked in a first horizontal configuration and FIG. 9H shows handle 502 locked in a second horizontal configuration. The side views of FIGS. 9G and 9G are rotated slightly about a vertical axis with respect to the orientation of handle 502 shown in FIG. 9F. This orientation shows side views of coupling features 504a and 504b, which each have holes 506a, 506b, and 506c. In the first horizontal configuration of FIG. 9G, hole 506a is visible while hole 506c is obscured from view in that hole 506c is engaged with pin 412 (also obscured in this view). In the second horizontal configuration of FIG. 9H, hole 506c is visible while hole 506a is obscured from view in that hole 506a is engaged with pin 412 (also obscured in the view).

Figure 10A:
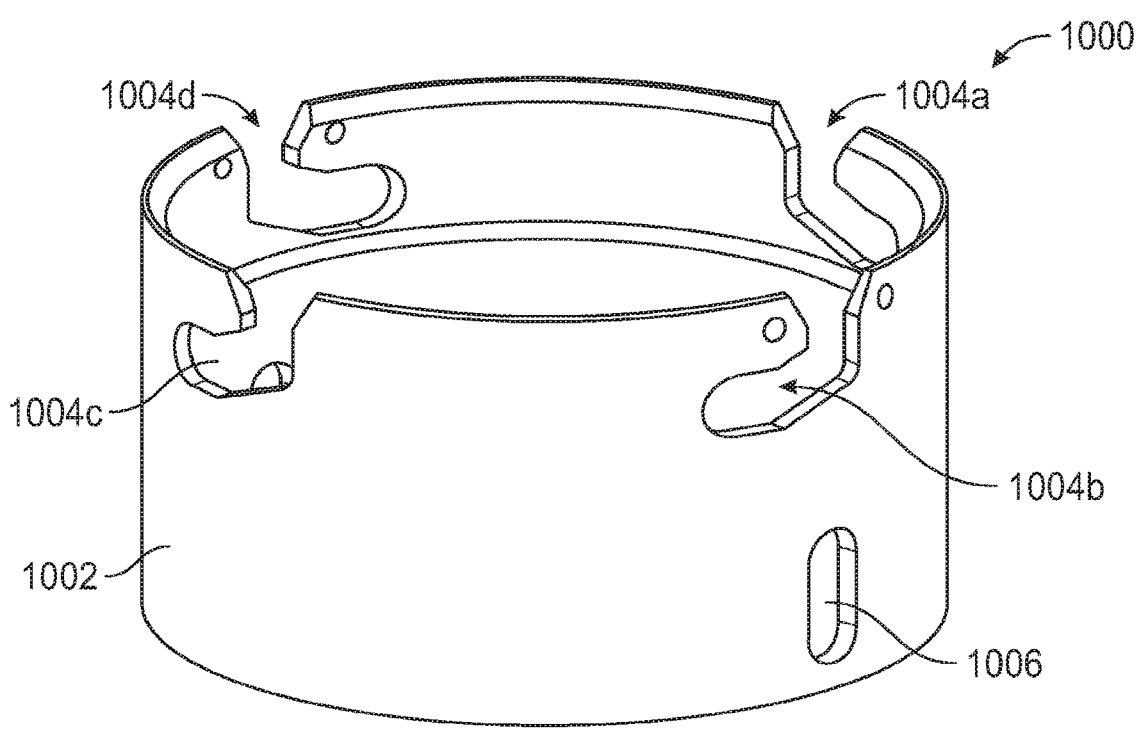
FIG. 10A is a three-dimensional view of a vent plug parking receptacle, in accordance with one or more embodiments of the disclosure.

FIG. 10A is a three-dimensional view of a vent plug parking receptacle 1000, in accordance with one or more embodiments of the disclosure. Parking receptacle 1000 has a cylindrically shaped body 1002 and has coupling features that are configured to engage with corresponding coupling features of a suction pile vent plug. For example, parking receptacle 1000 may include J-holes 1004a, 1004b, 1004c, and 1004d. As described above, parking receptacle 1000 may be configured to hold a vent plug while a corresponding suction pile vent is in an open configuration. Parking receptacle 1000 may have one or more additional holes 1006 to allow water to flow through parking receptacle 1000 while a suction pile plug is secured to parking receptacle 1000. Parking receptacle 1000 may be welded to a top surface 106 of a suction pile, as described above with reference to FIG. 2.

Figure 10B:
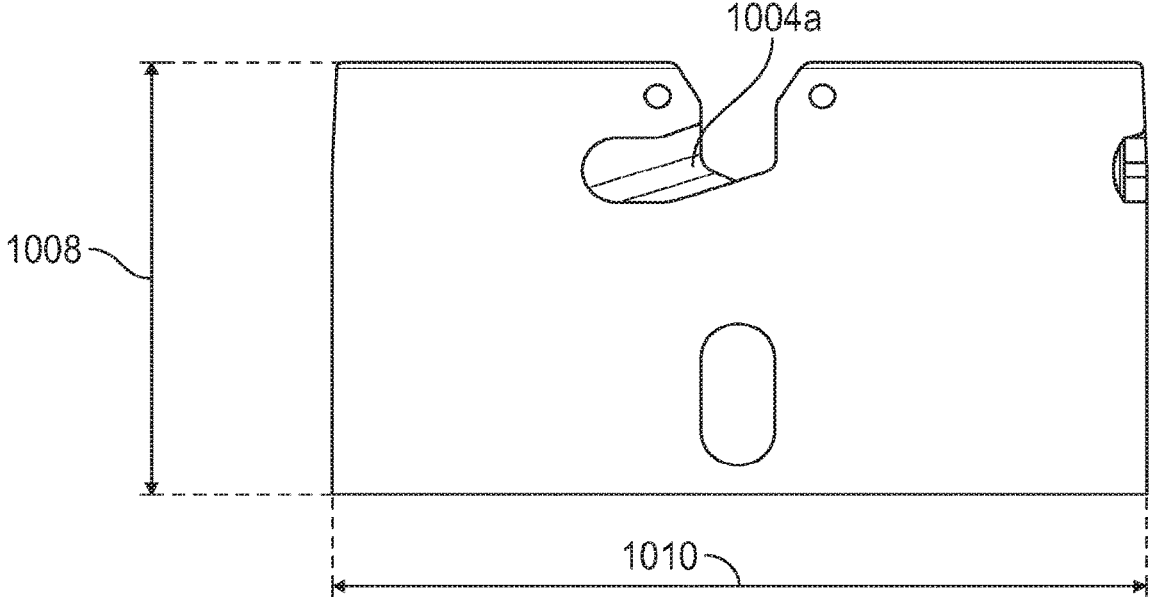
FIG. 10B is a side view of the vent plug parking receptacle shown in FIG. 10A, in accordance with one or more embodiments of the disclosure.

FIG. 10B is a side view of vent plug parking receptacle 1000, in accordance with one or more embodiments of the disclosure. As shown, parking receptacle 1000 has a height 1008 and a diameter 1010. In an embodiment, height 1008 may be 14 inches and diameter 1010 may be 24 inches. Other embodiments may have other dimensions for comparable features.

Figure 11B:
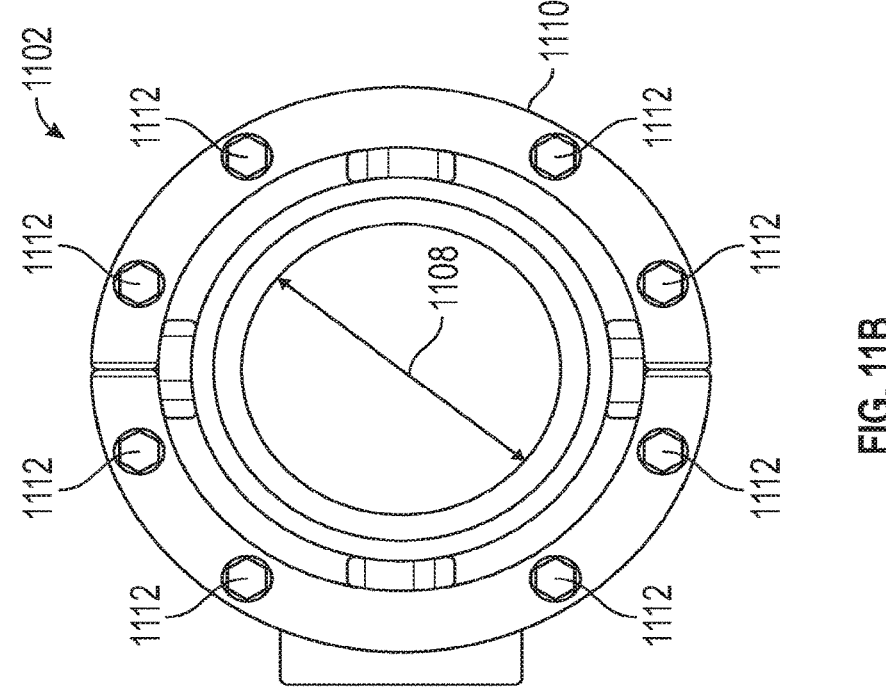
FIG. 11B is a top view of the fluidic port shown in FIG. 11A, in accordance with one or more embodiments of the disclosure.
Figure 11A:
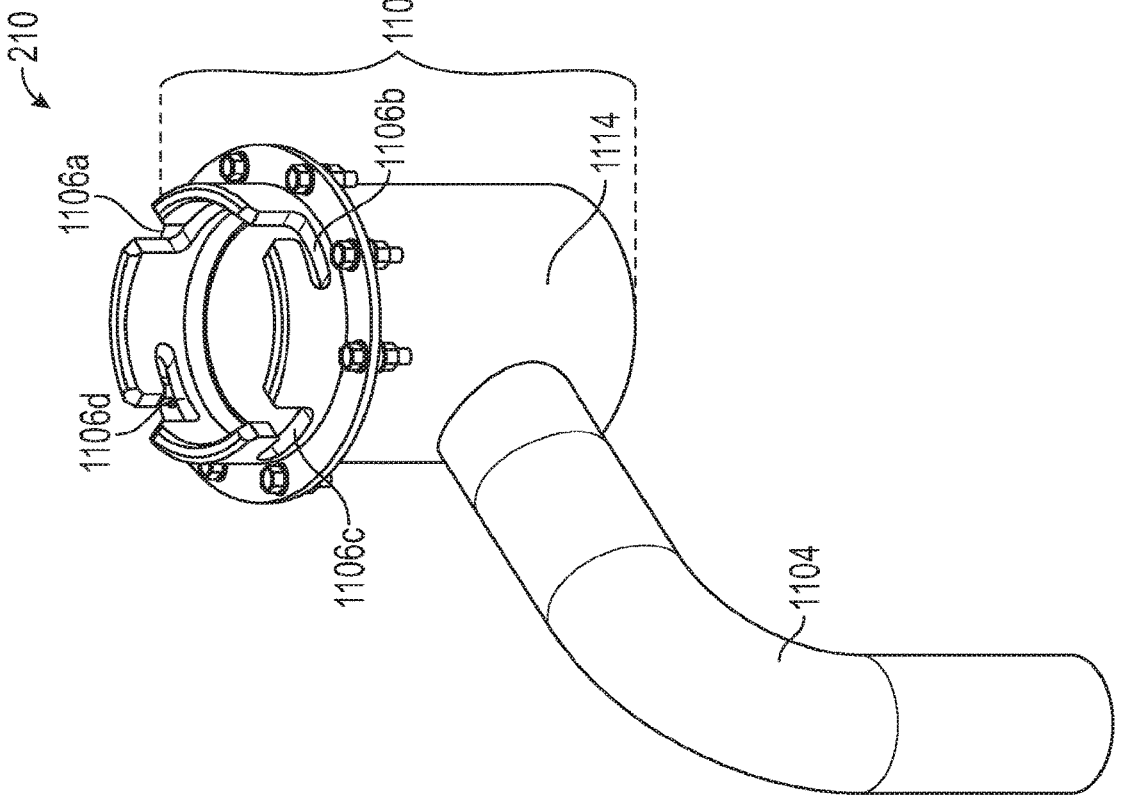
FIG. 11A is a three-dimensional view of a fluidic port, in accordance with one or more embodiments of the disclosure.

FIG. 11A is a three-dimensional view of a fluidic port 210, in accordance with one or more embodiments of the disclosure. Fluidic port 210 has a coupling structure 1102 and a fluidic conduit 1104. As described above with reference to FIG. 2, coupling structure 1102 of fluid port 210 may be configured to engage with fluidic coupling 212a (i.e., a hot stab), or with plug 212b (i.e., a dummy stab). Details of fluidic coupling 212a and plug 212b are provided below with reference to FIGS. 12A to 14D. Coupling structure 1102 may include coupling features such as J-holes 1106a, 1106b, 1106c, and 1106d that may be configured to engage with corresponding coupling features of fluidic coupling 212a or with plug 212b, as described below.

FIG. 11B is a top view of the fluidic port shown in FIG. 11A showing details of coupling structure 1102, in accordance with one or more embodiments of the disclosure. This top view shows that fluidic port has an inner diameter 1108. In this example, diameter 1108 may be 3 inches. Other embodiments may have other dimensions for comparable features. Coupling structure 1102 may include a flange 1110 and various mechanical fasteners 1112. Flange 1110 may be configured to couple with a top surface of a support structure, such as support structure 208 described above with reference to FIG. 2. For example, a body portion 1114 (e.g., see FIG. 11A) of coupling structure 1102 may be configured to fit through a hole in support structure 208 while a diameter of flange 1110 may be larger than the hole in support structure. In this way, flange 1110 may be fastened to a top side of support structure 208 to thereby support fluidic port 210.

Figure 11C:
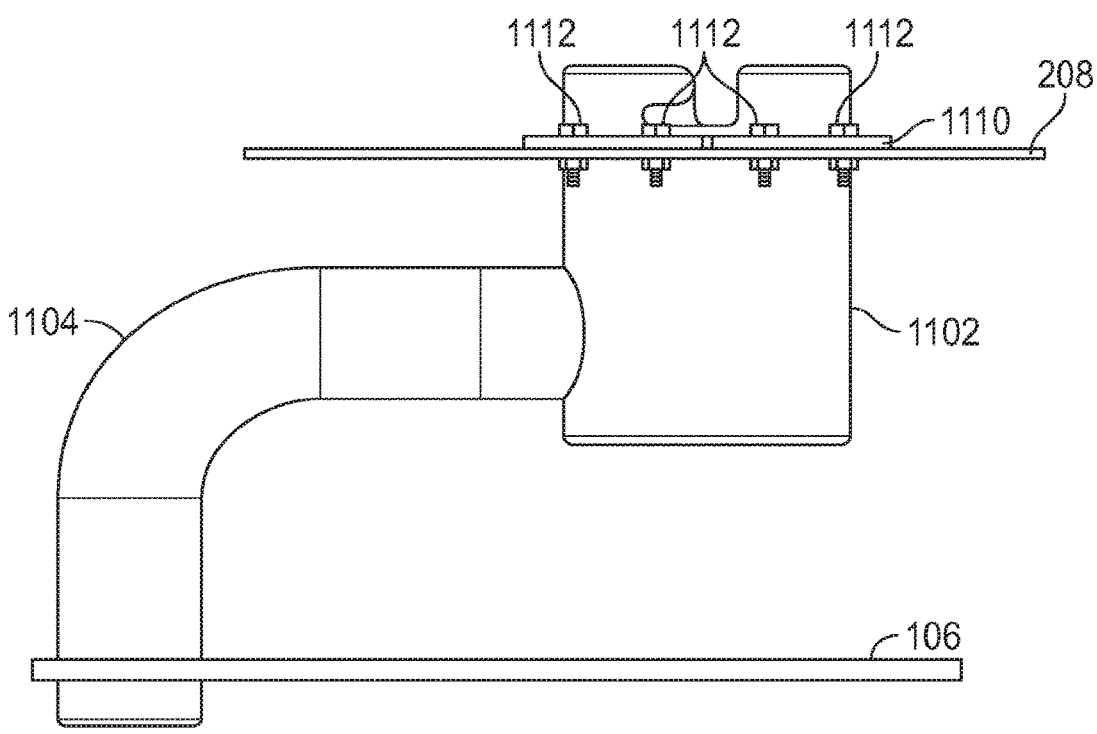
FIG. 11C is a side view of the fluidic port shown in FIG. 11A, in accordance with one or more embodiments of the disclosure.

FIG. 11C is a side view of fluidic port 210 shown in FIGS. 11A and 11B, in accordance with one or more embodiments of the disclosure. In this view, fluidic port 210 is shown in an installed configuration. In this regard, coupling structure 1102 is attached to, and supported by support structure 208. As described above, flange 1110 may be fastened to support structure 208 using a plurality of fasteners 1112. In this configuration, fluidic conduit 1104 may be attached to a top surface 106 of a suction pile (e.g., suction pile 102 of FIG. 2). Fluidic conduit 1104 may be configured to make a fluidic connection between suction pile 102 and coupling structure. As described above with reference to FIG. 2, a fluidic coupling 212a (i.e., a hot stab) may be coupled to port 210 to provide a fluidic path for water to be pumped into or out of suction pile 102. According to an embodiment, an ROV 120 (e.g., see FIG. 1) may be equipped with fluid pumps and may provide the fluidic coupling 212a that may engage with port 210 to pump water into or out of suction pile 102.

Figure 12A:
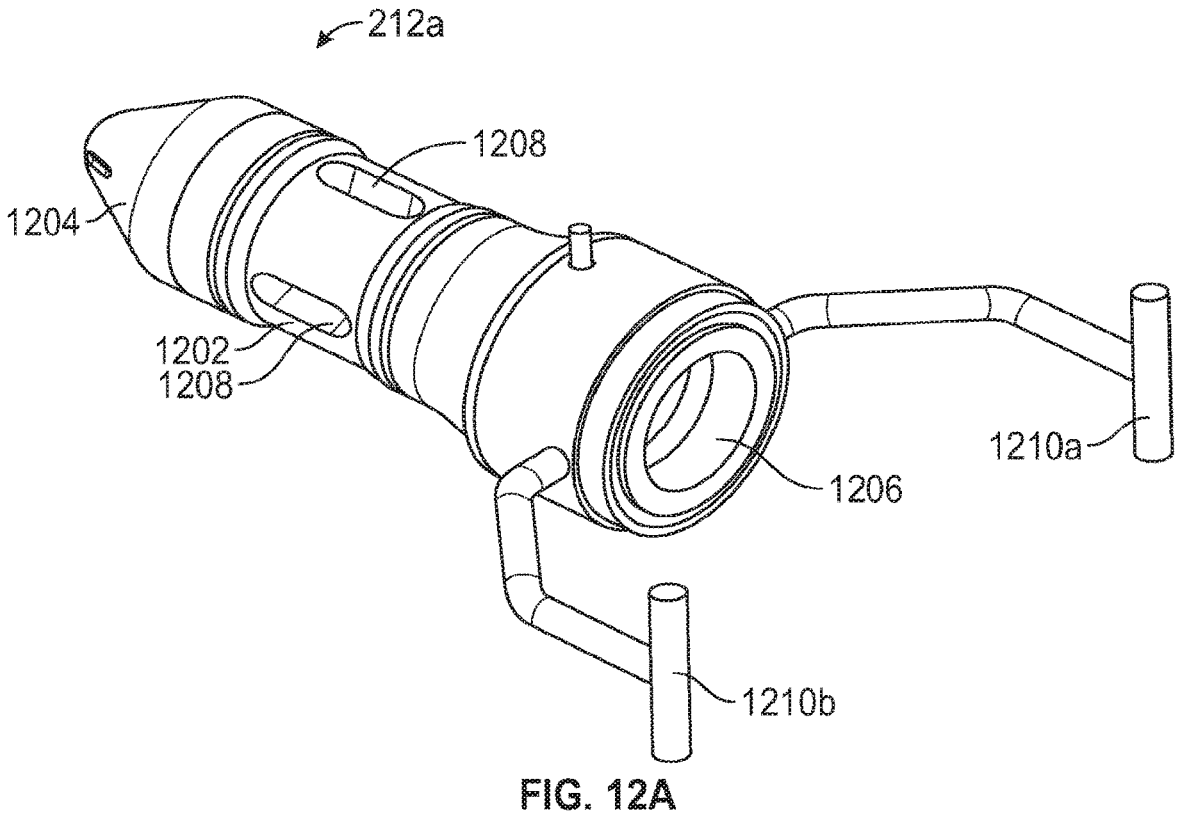
FIG. 12A is a three-dimensional view of a fluidic coupling, in accordance with one or more embodiments of the disclosure.

FIG. 12A is a three-dimensional view of a fluidic coupling 212a, in accordance with one or more embodiments of the disclosure. Fluidic coupling 212a is configured to couple with port 210 (e.g., see FIGS. 2 and 11A to 11C). In this regard, fluidic coupling 212a has a cylindrical body 1202 and a pointed nose cone 1204. Fluidic coupling 212a has a fluidic inlet 1206 and various apertures 1208 that form a fluidic outlet. When coupled to port 210, fluidic coupling 212a is configured to allow fluid to flow from inlet 1206 into the body 1202 of fluidic coupling 212a and out through apertures 1208. When coupled with port 210, fluid flowing out through apertures 1208 may be routed through coupling structure 1102 of port 210 and then through conduit 1104 and eventually into suction pile 102 (e.g., see FIGS. 2 and 11A to 11C). The role of inlet and outlet may be reversed, however, when pumping fluid out from suction pile 102. Fluidic coupling 212a may also have handles 1210a and 1210b. Handles 1210a and 1210b may be used to position fluidic coupling 212a into port 210.

Figures 12B, 12C:
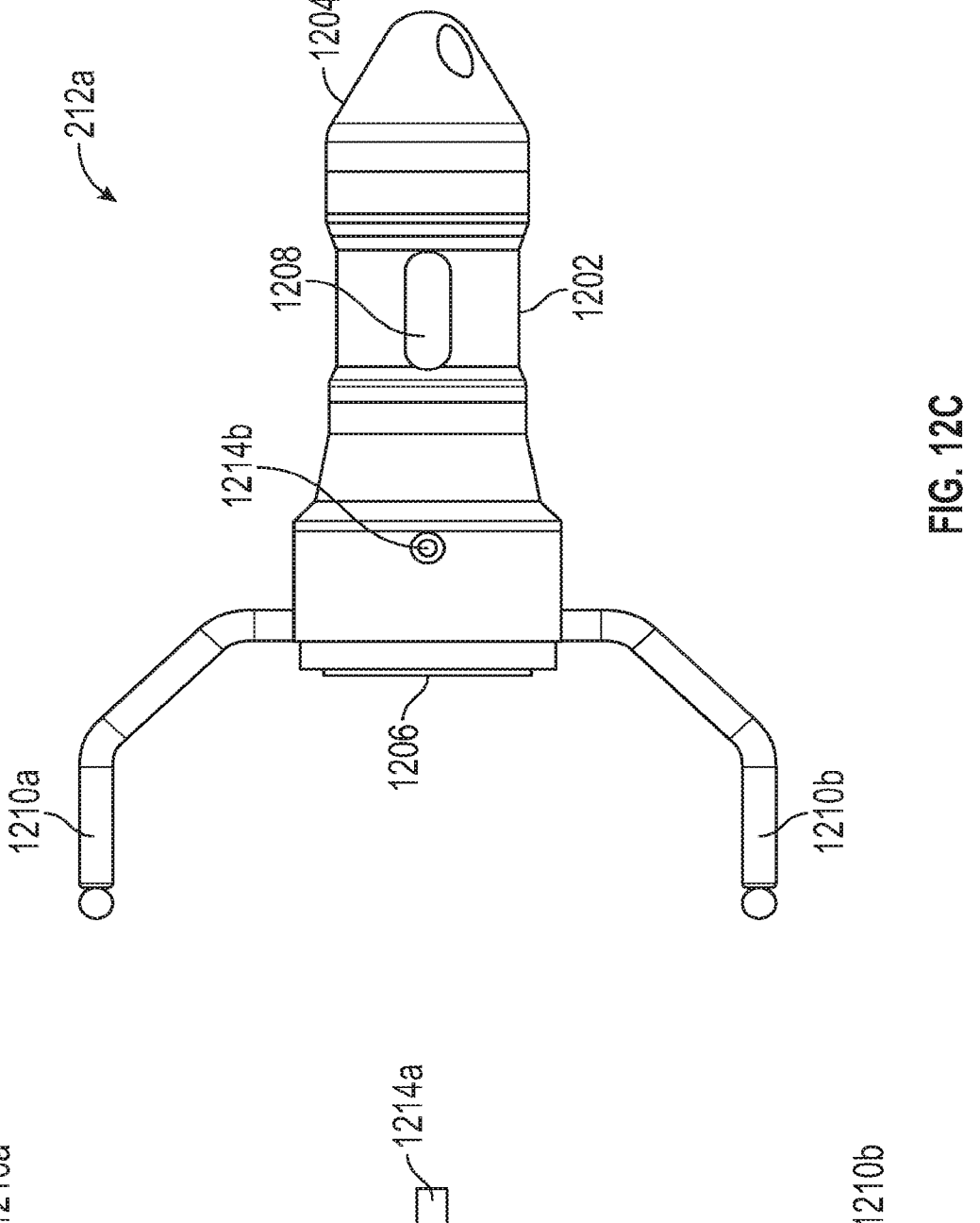
FIG. 12B is an axial view of the fluidic coupling shown in FIG. 12A, in accordance with one or more embodiments of the disclosure.
FIG. 12C is a side view of the fluidic coupling shown in FIG. 12A, in accordance with one or more embodiments of the disclosure.

FIG. 12B is an axial view of fluidic coupling 212a, in accordance with one or more embodiments of the disclosure. This view shows coupling features 1214a and 1214b that are symmetrically placed relative to handles 1210a and 1210b. Coupling features 1214a and 1214b may be configured to engage with corresponding coupling features of port 210, such as J-holes 1106a to 1106d of port 210, described above with reference to FIG. 11A.

FIG. 12C is a side view of fluidic coupling 212a, in accordance with one or more embodiments of the disclosure. This view shows the relative placement of handles 1210a and 1210b, cylindrical body 1202, inlet 1206, apertures 1208, and coupling feature 1214b. Corresponding coupling feature 1214a is not shown in this view as it is geometrically opposite to coupling feature 1214a.

Figure 13A:
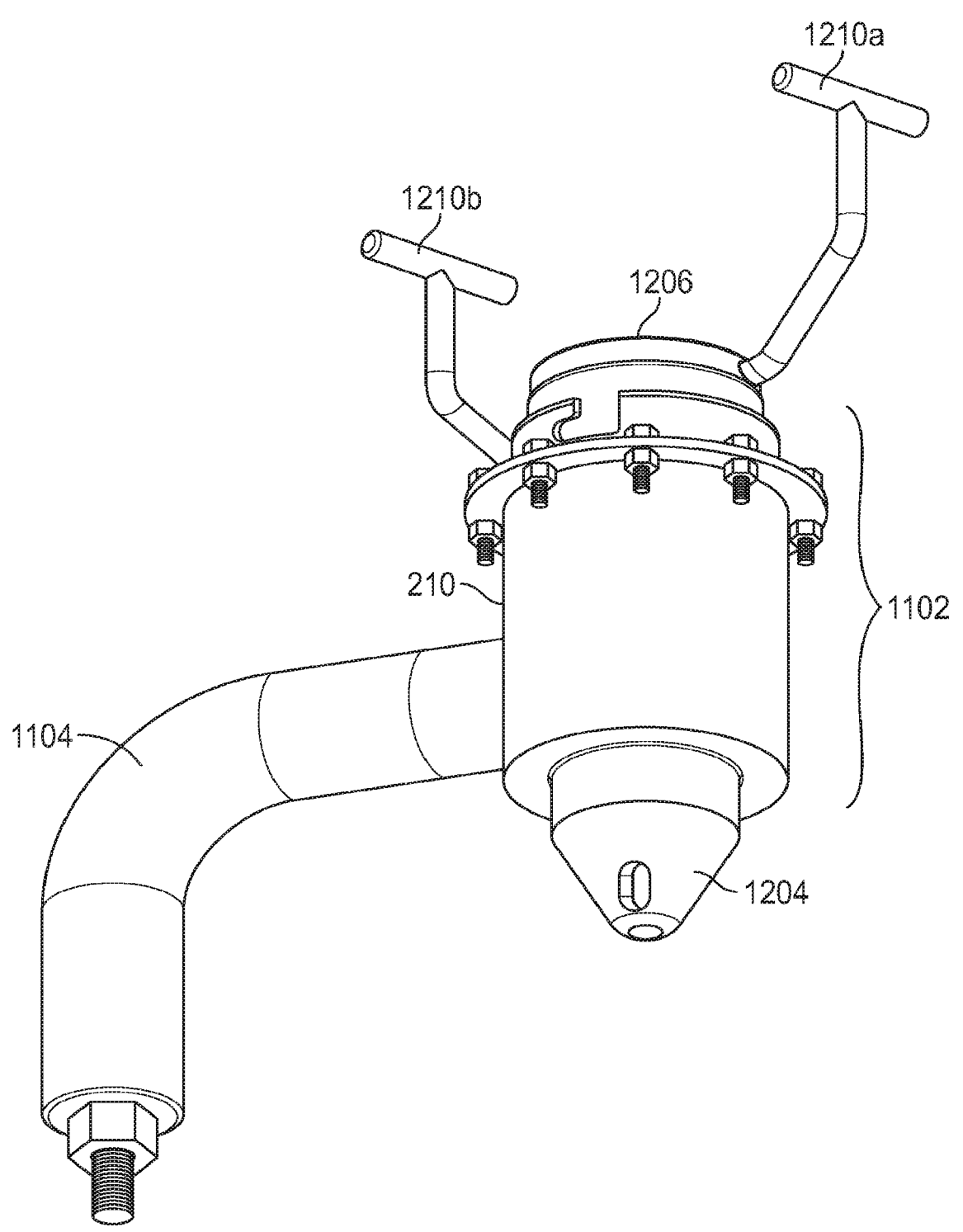
FIG. 13A is a three-dimensional view of a fluidic coupling installed in a fluidic port, in accordance with one or more embodiments of the disclosure.
Figure 13D:
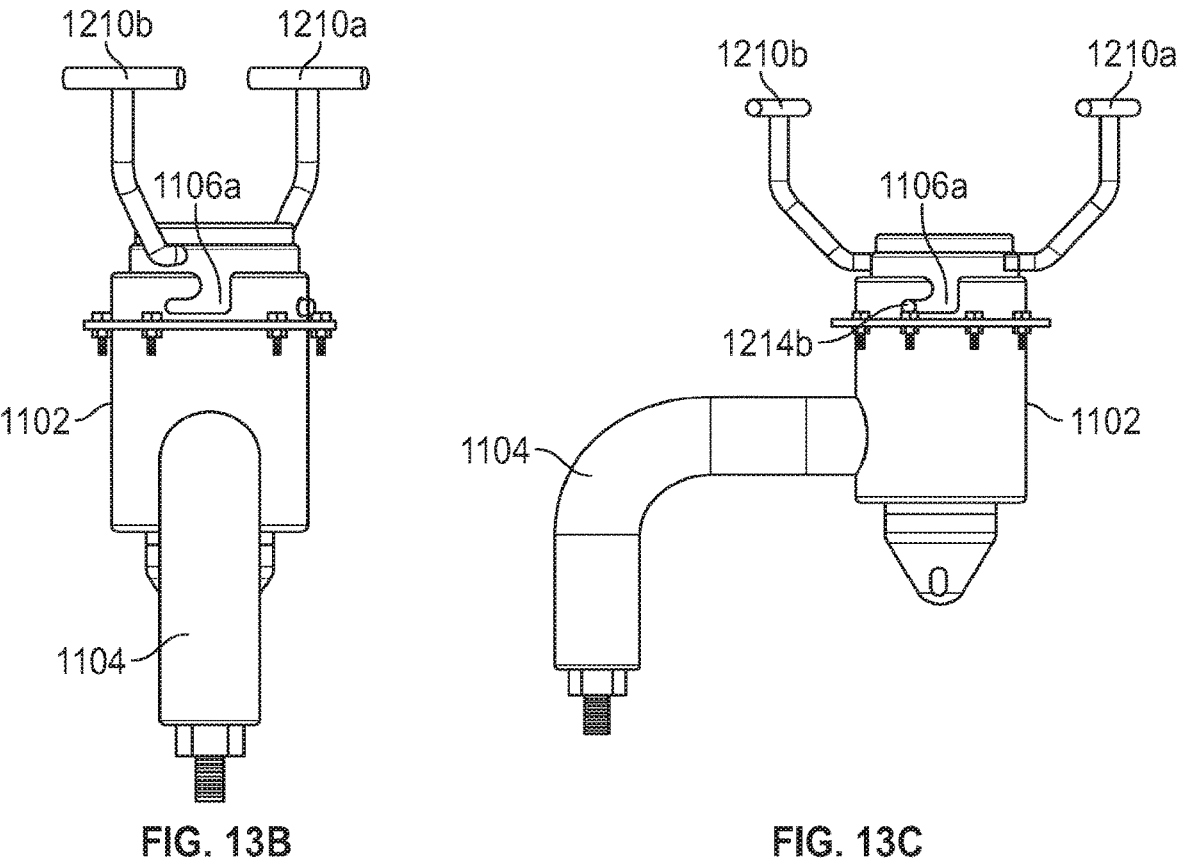
FIG. 13D is a top view of the fluidic coupling installed in a fluidic port shown in FIG. 13A, in accordance with one or more embodiments of the disclosure.
Figure 13D:
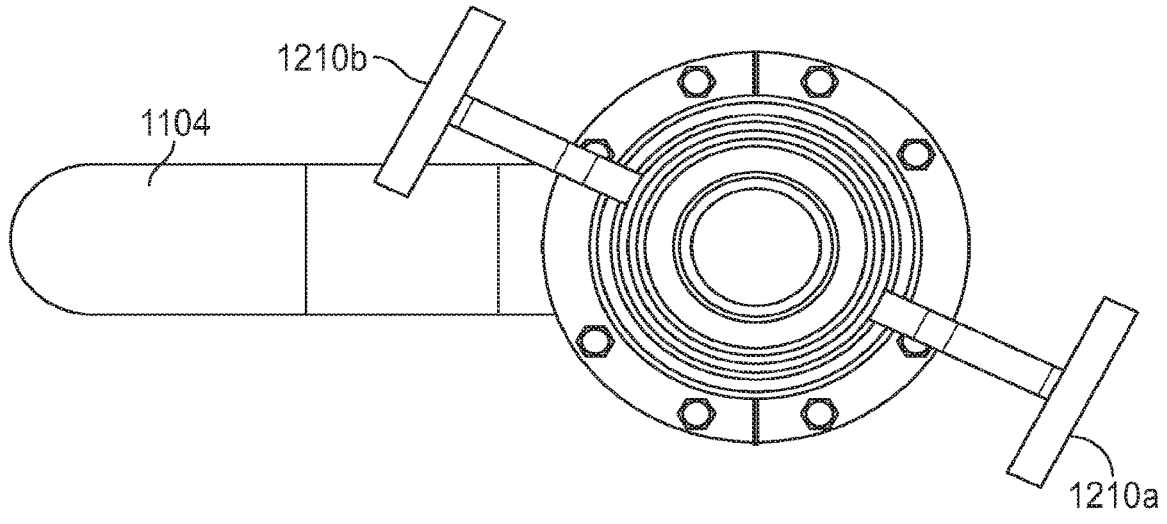

FIGS. 13A to 13D show various views fluidic coupling 212a installed in fluidic port 210, in accordance with one or more embodiments of the disclosure. FIG. 13A is a three-dimensional view, FIGS. 13B and 13C are side views, and FIG. 13D is a top view. In each of FIGS. 13A to 13D, handles 1210a and 1210b, coupling structure 1102, nose cone 1204 and conduit 1104, are shown. FIGS. 13B and 13C also show coupling features of port 210 and fluidic coupling 212a. In this regard, FIGS. 13B and 13C show J-hole 1106a of port 210 and FIG. 13C shows coupling feature 1214b of fluidic coupling 212a.

Figure 14A:
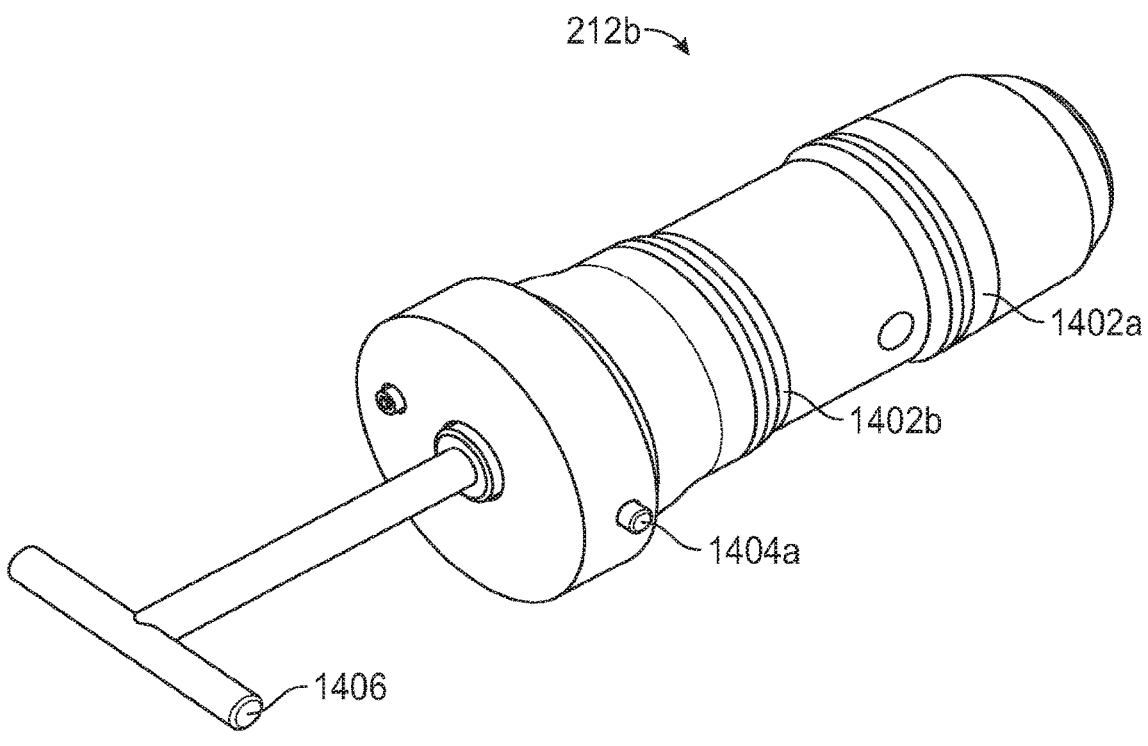
FIG. 14A is a three-dimensional view of a plug, in accordance with one or more embodiments of the disclosure.

FIG. 14A is a three-dimensional view of a plug 212b, in accordance with one or more embodiments of the disclosure. Plug 212b is configured to engage with fluidic port 210 (e.g., see FIGS. 2 and 11A to 11C) when fluidic port 210 is not being used to pump water into or out of a suction pile. Plug 212b is configured to fit into fluidic port 210 and to form a watertight seal with port 210. In this regard, plug 212b may include O-rings 1402a and 1402b that may engage with walls of fluidic port 210 to thereby form a watertight seal. Plug 212b may further include one or more coupling features 1404a. Coupling features, such as coupling feature 1404a, may engage with corresponding coupling features of port 210 to secure plug 212b in port 210. Plug 212b may further include a handle 1406. Handle 1406 may be used to move plug 212b into position or to remove plug 212b from engagement with port 210. Further, handle 1406 may be used to twist plug 212b about an axial direction to rotate coupling features into and out of coupling features (e.g., J-holes 1106a to 1106d) of coupling structure 1102 of port 210.

Figure 14B:
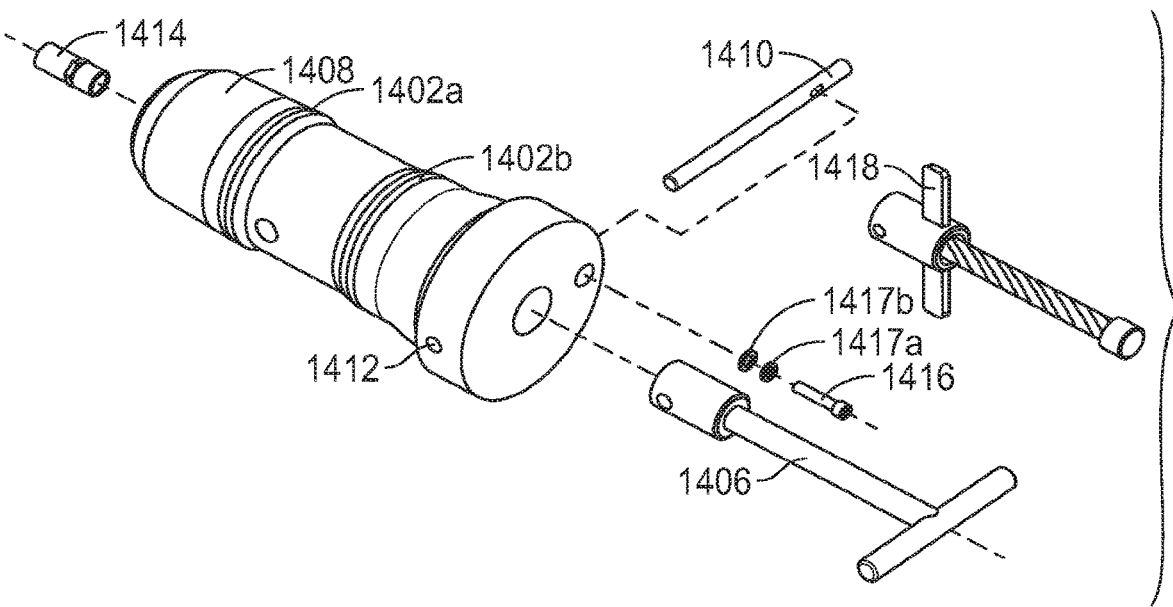
FIG. 14B is a three-dimensional exploded view of the plug shown in FIG. 14A, in accordance with one or more embodiments of the disclosure.

FIG. 14B is a three-dimensional exploded view of plug 212b shown in FIG. 14A, in accordance with one or more embodiments of the disclosure. Plug 212b (e.g., also known as a "dummy stab") may include a vented handle 1406 and a vented body 1408. Together, vented handle 1406 and vented body 1408 allow plug 212b to breath while prohibiting marine life from entering port 210 through plug 212b. Plug 212b may further include a lock bar 1410. When inserted into a through-hole 1412 of plug body 1408, lock bar 1410 may extend through plug body 1408 and protrude slightly from opposite sides of plug body. The protruding ends of lock bar 1410 may then serve as coupling features that may engage with corresponding coupling features of port 210, as described above. When assembled, lock bar 1410 may be held by fasteners that may include a screw 1416, a spring lock washer 1417a, and a flat washer 1417b.

Plug 212b may further include a pneumatic muffler 1414 that may act to reduce vibrations that may otherwise cause wear and tear of plug 212b. As mentioned above, plug 212b may include two rubber O-rings, 1402a and 1402b, which form a watertight seal between plug 212b and walls of port 210. In an alternative embodiment, plug 212b may include a pigtail handle 1418.

Figures 14C, 14D, 15A, 15B:
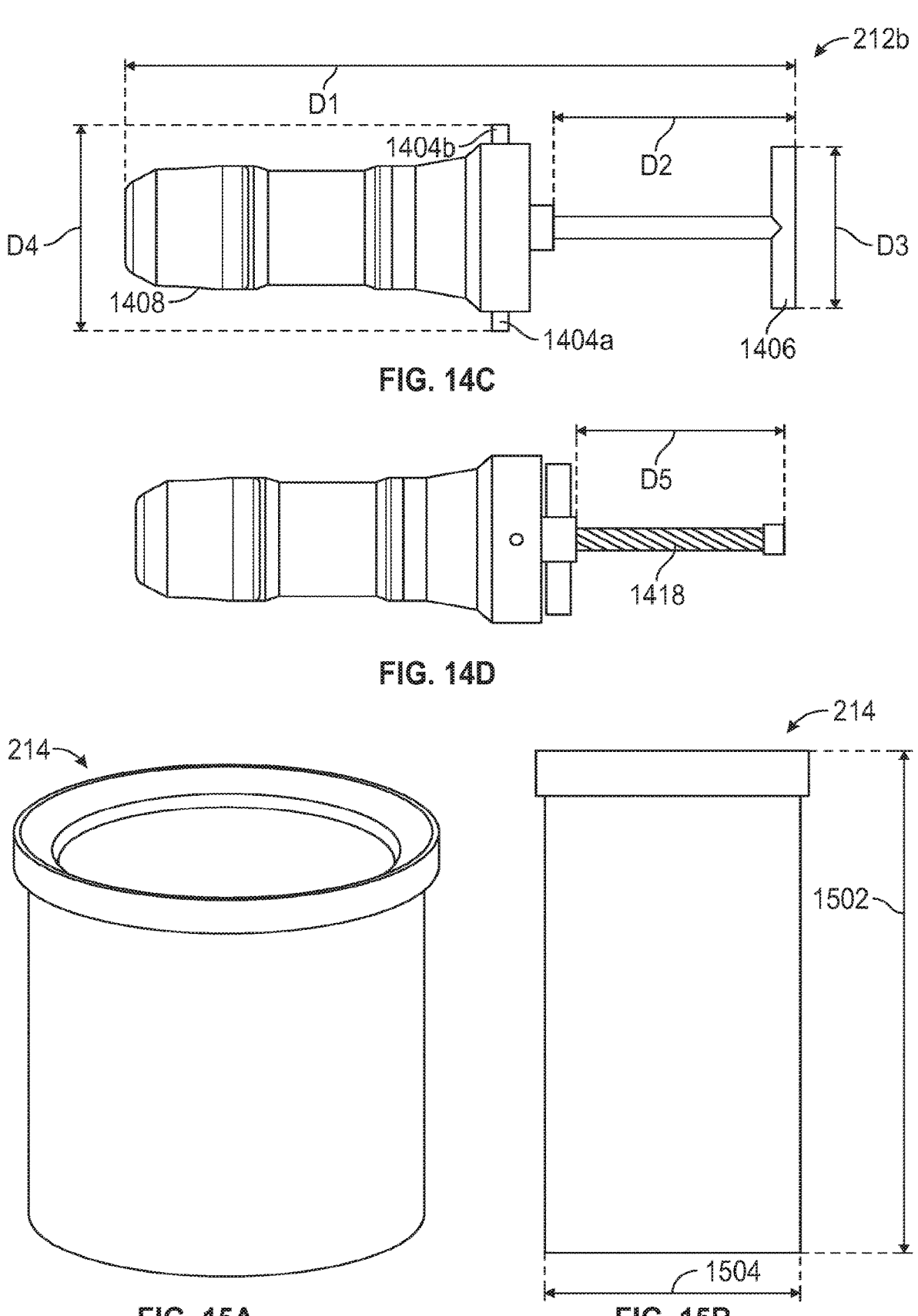
FIG. 14C is a side view of a plug having a first configuration, in accordance with one or more embodiments of the disclosure.
FIG. 14D is a side view of a plug having a second configuration, in accordance with one or more embodiments of the disclosure.
FIG. 15A is a three-dimensional view of a parking receptacle, in accordance with one or more embodiments of the disclosure.
FIG. 15B is a side view of the parking receptacle shown in FIG. 15A, in accordance with one or more embodiments of the disclosure.

FIG. 14C is a side view of plug 212b having a first configuration, in accordance with one or more embodiments of the disclosure. The embodiment of FIG. 14C includes vented handle 1406. In this view, ends of lock bar 1410 (e.g., see FIG. 14B) are shown protruding from opposite ends of plug body 1408. Protruding ends 1404a and 1404b may serve as coupling features, as mentioned above. Dimensions of plug 212b in FIG. 14C are indicated by distances D1, D2, D3, and D4. In this example, distances may take values including D1=22.1 inches, D2=7 and 7/8 inches, D3=6 inches, and D4=7 and 1/2 inches. Other embodiments may include other dimensions for comparable features.

FIG. 14D is a side view of plug 212b having a second configuration, in accordance with one or more embodiments of the disclosure. In this second configuration, plug 212b may include pigtail handle 1418, described above with reference to FIG. 14B. Pigtail handle 1418 may be characterized by a distance D5. In this example, this distance may have the value D5=6 and 7/8 inches. Other embodiments may include other dimensions for comparable features.

FIG. 15A is a three-dimensional view, and FIG. 15B is a side view, of parking receptacle 214, in accordance with one or more embodiments of the disclosure. Parking receptacle 214 may be configured to hold fluidic coupling 212a (e.g., see FIGS. 2, 12A, 12B, and 12C) or plug 212b (e.g., see FIGS. 2, 14A to 14D). Parking receptacle 214 is a cylindrical structure that may be welded to support structure 208 (e.g., see FIG. 2). Parking receptacle 214 may be characterized by a height 1502 and a diameter 1504. In this example, height 1502 may be 11 and 1/4 inches, and diameter 1504 may be configured to fit a hole in support structure 208 having a diameter between 6 and 1/4 inches to 6 and 3/8 inches. Other embodiments may include other dimensions for comparable features.

Figure 16B:
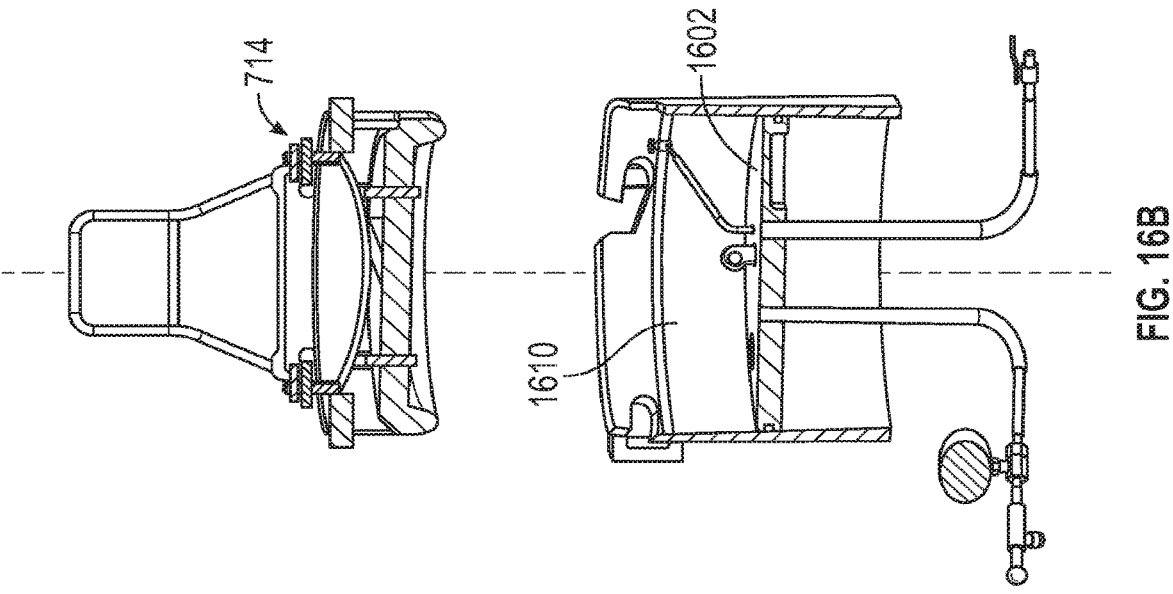
FIG. 16B is a cross-sectional view of the suction pile vent with vent plug and testing equipment shown in FIG. 16A, in accordance with one or more embodiments of the disclosure.
Figure 16A:
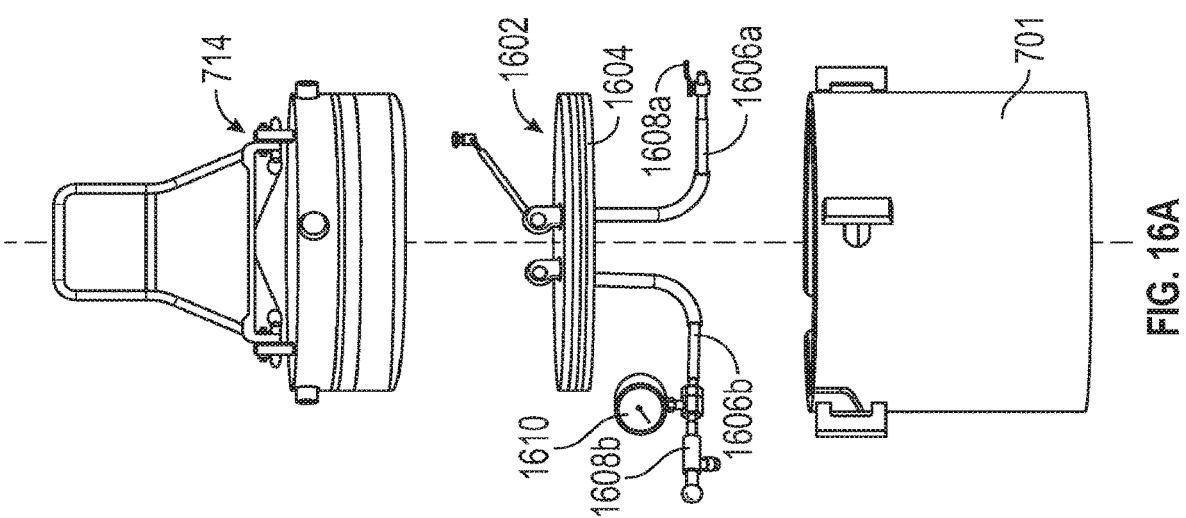
FIG. 16A is an exploded side view of a suction pile vent with vent plug and testing equipment, in accordance with one or more embodiments of the disclosure.

FIG. 16A is an exploded side view of suction pile vent 701 with vent plug 714 and testing equipment 1602, in accordance with one or more embodiments of the disclosure. Testing equipment 1602 includes a circular disk 1604 that is configured to be placed into suction pile vent 701. Equipment 1602 further includes hoses 1606a and 1606b, valves 1608a and 1608b, and a pressure gauge 1610. Once placed within vent 701, circular disk 1602 is configured to form a watertight seal with the walls of vent 701.

FIG. 16B is a cross-sectional view of the suction pile vent 701 with vent plug 714 and testing equipment 1602, in accordance with one or more embodiments of the disclosure. In this view, testing equipment. Testing equipment 1602 is configured to be supported by cylindrical ledge 908 (e.g., see FIG. 9C and related description above). Circular disk 1604 is configured to form a watertight seal with cylindrical ledge 908. A test of the degree to which vent plug 714 forms a watertight seal with suction pile vent 701 may be performed using testing equipment 1602, as follows.

Once testing equipment 1602 has been installed as shown in FIG. 16B, vent plug may be installed in suction pile vent 701, as described above. Water may then be pumped into a space 1610 formed between circular disk 1604 and vent plug 714 using hoses 1606a and 1606b. Valves 1608a and 1608b may then be closed to keep water in 1610. Pressure gauge 1610 may be used to measure pressure of the water enclosed in space 1610. Water pressure will decrease over time if there are any leaks between vent plug 714 and suction pile vent 701. The absence of a pressure decrease indicates that a watertight seal between vent plug 714 and suction pile vent 701 exists.

Conditional language, such as, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of suction pile equipment. The examples illustrate various features of the disclosure, but those of ordinary skill in the art may recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not limiting. Although specific terms are employed herein, they are used in a generic and descriptive sense only, and not used for purposes of limitation.

What is claimed is:

1. A testing device for testing a suction pile vent plug, comprising:
   a circular disk having a first aperture extending from a top surface of the circular disk to a bottom surface of the circular disk, wherein the circular disk is configured to be mounted inside of and to form a watertight seal with a cylindrical wall of a suction pile vent;
   a first hose having a first end coupled to and forming a watertight seal with the first aperture on the bottom surface of the circular disk;
   a pressure gauge operatively coupled to the first hose so as to detect a pressure of a fluid in the first hose; and
   a first valve coupled to the first hose such that the pressure gauge is located between the first end and the first valve.

2. The testing device of claim 1, wherein a seal member is mounted on an outer edge of the circular disk, the seal member being configured to form a watertight seal with the cylindrical wall of a suction pile vent.

3. The testing device of claim 1, wherein a diameter of the circular disk is such that the circular disk can be mounted against a ledge formed on an inner cylindrical wall of a suction pile vent.

4. The testing device of claim 1, wherein when the circular disk is mounted in a lower portion of a cylindrical wall of a suction pile vent and a suction pile vent plug is mounted in an upper portion of the cylindrical wall of the suction pile vent, and when the first valve is closed, the pressure gauge can be used to detect a pressure of a fluid in a space formed between a bottom of the suction pile vent plug and the top surface of the circular disk.

5. The testing device of claim 1, wherein a second aperture is formed in the circular disk, the second aperture extending from the top surface of the circular disk to the bottom surface of the circular disk, the testing device further comprising:
   a second hose having a first end coupled to and forming a watertight seal with the second aperture on the bottom surface of the circular disk; and
   a second valve coupled to the second hose.

6. The testing device of claim 5, wherein when the circular disk is mounted in a lower portion of a cylindrical wall of a suction pile vent and a suction pile vent plug is mounted in an upper portion of the cylindrical wall of the suction pile vent, and when the first valve is closed, fluid can be introduced through the second hose into a collection space formed between a bottom of the suction pile vent plug and the top surface of the circular disk such that the pressure gauge measures a fluid pressure in the collection space.

7. The testing device of claim 6, wherein when fluid is introduced into the collection space such that the fluid in the collection space is at a first pressure, and the first and second valves are closed, any drop in pressure below the first pressure as measured by the pressure gauge will be indicative of a fluid leak out of the collection space.

8. A method of testing a suction pile vent and a suction pile vent plug with a testing device, comprising:
   mounting the testing device in a lower portion of a cylindrical wall of the suction pile vent;
   mounting a suction pile vent plug in an upper portion of the cylindrical wall of the suction pile vent;
   introducing fluid into a collection space formed between a lower surface of the suction pile vent plug and an upper surface of the testing device;
   raising a pressure of the fluid in the collection space to a first pressure; and
   monitoring the pressure of the fluid in the collection space for a predetermined period of time to determine if there are any fluid leaks out of the collection space.

9. The method of claim 8, wherein:
   the testing device comprises:
      a circular disk having a first aperture extending from a top surface of the disk to a bottom surface of the disk, wherein the circular disk is configured to be mounted inside of and to form a watertight seal with a cylindrical wall of a suction pile vent;
      a first hose having a first end coupled to and forming a watertight seal with the first aperture on the bottom surface of the circular disk;
      a pressure gauge operatively coupled to the first hose so as to detect a pressure of a fluid in the first hose; and
      a first valve coupled to the first hose such that the pressure gauge is located between the first end and the first valve; and
   wherein introducing fluid into the collection space comprises delivering fluid into the collection space via the first hose and the first aperture in the circular disk.

10. The method of claim 9, wherein raising the pressure of the fluid in the collection space to a first pressure comprises introducing pressurized fluid into the collection space via the first hose and the first aperture in the circular disk.

11. The method of claim 10, wherein monitoring the pressure of the fluid in the collection space comprises:
   closing the first valve after the pressure of the fluid in the collection space has been raised to the first pressure; and
   monitoring the pressure of the fluid in the collection space with the pressure gauge.

12. The method of claim 9,
   wherein a second aperture is formed in the circular disk, the second aperture extending between the top surface and the bottom surface of the circular disk, wherein the testing device further comprises:
      a second hose having a first end coupled to and forming a watertight seal with the second aperture on the bottom surface of the circular disk; and a second valve coupled to the second hose; and wherein introducing fluid into the collection space comprises delivering fluid into the collection space via the second hose and the second aperture in the circular disk.

13. The method of claim 12, wherein raising the pressure of the fluid in the collection space comprises closing the first valve and introducing pressurized fluid into the collection space via the second hose and the second aperture in the circular disk, and wherein monitoring the pressure of the fluid in the collection space comprises:

closing the second valve after the pressure of the fluid in the collection space has been raised to the first pressure; and monitoring the pressure of the fluid in the collection space with the pressure gauge.

14. A testing device for testing a suction pile vent plug, comprising:

a circular disk having a top surface and a bottom surface, wherein first and second apertures extend through the circular disk from the top surface of the disk to the bottom surface of the disk, and wherein the circular disk has a size and shape that allow the circular disk to be mounted inside of and to form a watertight seal with a cylindrical wall of a suction pile vent;

a first hose having a first end coupled to the first aperture at the bottom surface of the circular disk;

a second hose having a first end coupled to the second aperture at the bottom surface of the disk; and a pressure gauge operatively coupled to the first hose so as to detect a pressure of a fluid in the first hose.

15. The testing device of claim 14, further comprising:

a first valve coupled to the first hose such that the pressure gauge is located between the first end of the first hose and the first valve; and a second valve coupled to the second hose.

16. The testing device of claim 15, wherein when the circular disk is mounted in a lower portion of a cylindrical wall of a suction pile vent and a suction pile vent plug is mounted in an upper portion of the cylindrical wall of the suction pile vent, and when the first valve is closed, pressurized fluid can be introduced through the second hose into a collection space formed between a bottom of the suction pile vent plug and the top surface of the circular disk to raise a pressure in the collection space, and wherein the pressure gauge will be capable of measuring the fluid pressure in the collection space.

17. The testing device of claim 16, wherein when pressurized fluid is introduced into the collection space such that the fluid in the collection space is at a first pressure, and the first and second valves are closed, any drop in pressure below the first pressure as measured by the pressure gauge will be indicative of a fluid leak out of the collection space.

18. The testing device of claim 14, wherein a seal member is mounted on an outer edge of the circular disk, the seal member being configured to form a watertight seal with the cylindrical wall of a suction pile vent.

19. The testing device of claim 14, wherein a diameter of the circular disk is such that the circular disk can be mounted against a ledge formed on an inner cylindrical wall of a suction pile vent.

* * * * *